United States Patent [19]
Harrington et al.

[11] Patent Number: 5,701,401
[45] Date of Patent: Dec. 23, 1997

[54] PRINTING BLACK AND WHITE REPRODUCIBLE COLOR DOCUMENTS

[75] Inventors: Steven J. Harrington, Webster; Jean A. Taber, Williamson, both of N.Y.

[73] Assignee: Xerox Corporation, Stamford, Conn.

[21] Appl. No.: 720,654

[22] Filed: Oct. 2, 1996

[51] Int. Cl.[6] .............. G06K 15/02; H04N 1/50; H04N 1/56; H04N 1/23

[52] U.S. Cl. .............. 395/109; 358/501; 358/530; 358/401

[58] Field of Search .............. 395/109; 358/536, 358/535, 456, 534, 530, 501, 401, 298, 296

[56] References Cited

U.S. PATENT DOCUMENTS

| | | |
|---|---|---|
| 3,807,852 | 4/1974 | Hoydic. |
| 4,308,553 | 12/1981 | Roetling ............ 358/534 |
| 4,703,318 | 10/1987 | Haggerty. |
| 5,098,817 | 3/1992 | Voorhees. |
| 5,138,465 | 8/1992 | Ng et al.. |
| 5,142,337 | 8/1992 | Karidis et al.. |
| 5,153,576 | 10/1992 | Harrington ............ 358/456 |
| 5,153,739 | 10/1992 | Laman et al.. |
| 5,291,243 | 3/1994 | Heckman et al.. |
| 5,321,470 | 6/1994 | Hasuo et al.. |

Primary Examiner—Scott A. Rogers
Attorney, Agent, or Firm—Mark Costello

[57] ABSTRACT

A color image is reproduced with a set of colors wherein each color is defined in terms of a pattern block. Pattern blocks include a pattern using the color to be reproduced and white in density-related combinations so that the luminance difference between the color and white can be retained when copied or printed with a black printer. The patterns add among colors thus allowing combination colors to be represented in terms of added patterns of colors represented in black as distinct patterns.

14 Claims, 9 Drawing Sheets

PRINTING BLACK AND WHITE REPRODUCIBLE COLOR DOCUMENTS

FIELD OF THE INVENTION

The present invention relates to a method and apparatus for printing color documents in such a manner that when the color documents are reproduced on a black and white copier or printer, their color information content is retained.

COPYRIGHT NOTICE

A portion of the disclosure of this patent document contains material which is subject to copyright protection. The copy right owner has no objection to the facsimile reproduction by anyone of the patent document or the patent disclosure, as it appears in the Patent and Trademark Office patent file or record, but otherwise reserves all copyright rights whatsoever.

BACKGROUND OF THE INVENTION

Color printers and copiers usually operate in work environments that still include black and white devices. While color printing has become increasingly common in the workplace, the cost of color printing still remains substantially above that of black and white printing. Thus, while color documents can be readily created for small volume use, large volume reproduction suggests that black and white printers or copiers should be used.

When a color document is copied to black and white, the information conveyed by the color can be lost. Information is often conveyed by color through the use of distinct colors representing distinct information. When color documents are copied on a black and white copier, or faxed on a black and white facsimile machine, or reproduced from a color file to a black and white print, information may be lost. These devices usually threshold the luminance component of the source image to represent the image in either black or white, raising the problem of translating the intermediate luminance of colored objects on a page. Many darker colors often copy as black, while lighter colors drop out completely. When gray tones are reproduced, they are often mottled or ragged. Ironically, increases in printer resolution and halftone frequency that improve color image quality act to exacerbate the copy problem. Increases in printer resolution make the image appear to the copier as well as to the human observer as smooth areas of intermediate luminance rather than a pattern of halftone dots.

Even if a copier could reproduce the luminance level of source colors reliably, many different colors have the same luminance and are therefore indistinguishable after copying. This may not be a severe problem for pictorial images where much of the information is in the luminance component, but for text or presentation graphics, color offers new dimensions for conveying information. Color can be used to organize important items, distinguish categories, and organize documents and document content. However, when copied or faxed to black and white, the distinguishing capability of color is lost.

The primary goals of most documents is to convey information. If one can anticipate that the document will be copied or faxed with a black-and-white reproduction device, and information might, therefore, be lost, it might be desirable to sacrifice some of the appearance of the original document for the sake of information content. One might, for example, decide not to use color at all. Alternatively, a selection may be made to use color and color features that can be copied well. Such choices are significant barriers in document creation.

It is known that selected background and/or alphanumeric text areas may be printed in repeating and/or varying patterns of highlight color and interposed with black repeating or varying patterns as disclosed, for example, for single pass xerographic printing of composite image security documents in U.S. Pat. No. 5,291,243 to Heckman et al. Some of such color patterns might also reproduce when such documents are copied on a black and white copier, however, such copying is not reliable.

Of further background interest are U.S. Pat. No. 5,308,553 to Roetling and U.S. Pat. No. 5,153,576 to Harrington. These patents, however, electronically convert a full color document into a monochrome facsimile for subsequent monochrome printing by electronically converting pixel by pixel the original solid colors into various different patterns of black only images. Such an arrangement, by definition, does not produce originals, which are reproduced in color, for subsequent copying on a black and white copier which retains the informational content of the original color image. Further, the patterns that these methods produce are limited either to a fixed set, or to designs directly controlled by only the three color components and where areas controlled by the different color components do not overlap.

Other patents of interest include U.S. Pat. No. 4,703,318 to Haggerty, which illustrates the idea of forming a character based monochromatic image from a digital representation of a color image by: (1) forming a character based representation of the color image in which a plurality of color characters each describe the background or foreground color within a defined area of the color image; (2) providing a plurality of color pattern masks each corresponding to a color in the color image comprising a pattern of light and dark dots capable of providing in the monochromatic image visual discrimination between areas of different color; (3) transforming the color characters into monochromatic characters by replacing the background and foreground colors of each color character in the corresponding pattern of light and dark dots; and (4) displaying the monochromatic characters on a character based output device. The present invention differs from Haggerty in that the goal is to produce a printed image in which is copyable, and in which colors and shades of colors can be reproduced to maintain the informational content of the original document which used those colors.

U.S. Pat. No. 3,807,852 to Hoydic illustrates an arrangement in which color is used to identify particular identified areas for copying on a black and white copier.

U.S. Pat. No. 5,321,470 to Hasuo et al relates to an arrangement which uses color and the processes of a color copier to prevent forgery of color documents by improper copying.

U.S. Pat. No. 5,138,465 to Ng et al relates to an apparatus and method for producing selectively edited reproductions of the original document in which alphanumeric character codes written using highlighted color arrangements designated treatment to be applied to a particular document.

U.S. Pat. No. 5,153,739 to Laman et al the use of different fonts corresponding to different colors. In such an arrangement, the difference in the font itself provides distinction between different colors which copied in black and white.

U.S. Pat. No. 5,098,817 to Voorhees teaches highlighting of text in a manner which will reproduce when electronically copied. This is accomplished by applying a tone to only that area of the document to be highlighted and so that the tone remains in place during copying. The tone is sufficiently dark so as to highlight text but light enough so that the text is readable.

U.S. Pat. No. 5,142,337 to Karidis et al teaches an arrangement for reproducing gray levels in place of colors in a two color printer.

U.S. Pat. No. 5,568,248 teaches that a pattern can be substituted for a color in a document reproduction.

The above identified references are incorporated herein by reference for their teachings.

SUMMARY OF THE INVENTION

The present invention is directed to a method and apparatus for producing a varying pattern in colors which allows the use of color in the creation of a color original, and will retain distinguishing color content when the color original is copied in black and white.

In accordance with one aspect of the invention, a color image is reproduced with a set of colors wherein each color is defined in terms of a pattern block. Pattern blocks include a pattern using the color to be reproduced and white in density-related combinations so that the luminance difference between the color and white can be retained when copied or printed with a black printer. The patterns add among colors thus allowing combination colors to be represented in terms of added patterns of colors represented in black as distinct patterns.

In accordance with another aspect of the invention, there is provided a method of reproducing color images that retains color intent including: a) receiving an image defined in terms of color primaries; b) projecting the color image onto a base pattern set, representing the component pattern that will be used, perhaps R, G, B, C, M, Y, W (white) and K (black); c) generating the component patterns for each of the colors in the basis set except white are generated, based on intensity of the color; d) redefining basis color patterns in terms of printing color patterns; and e), combining printing color patterns.

In accordance with yet another aspect of the invention, the basis color patterns may be redefined in terms of printing solely in black.

These and other aspects of the invention will become apparent from the following description used to illustrate a preferred embodiment of the invention and read in conjunction with the accompanying drawings in which:

FIG. 1 describes the overall process of the invention;

Initially, the principles of the invention will be discussed, before describing an embodiment of the invention. In accordance with the invention, a method to allow black and white friendly copying, is to impose a pattern in the colors in solid areas of an image, where the pattern has a distinctive appearance in the luminance component of the image. The idea is that upon copying, the pattern remains even though the color is lost. Thus one can tell that the area had color and even distinguish between areas of different colors since they will have different texture patterns. The motivation is similar to that of the above cited Roetling and Harrington patents, which map colors to black-and-white textures that can then be copied. The method described here differs, however, in that it produces colored textures that do not vary greatly from the original color for use in the original color document. Thus the document retains its colored look if it is not copied.

Figure 1:
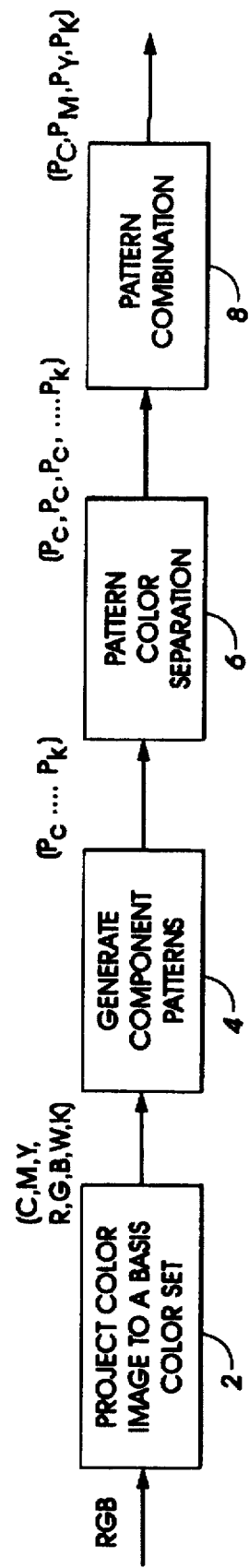

In considering the overall process, reference is made to FIG. 1. Initially an image is received, typically defined in terms of Red, Green, Blue (R, G, B) or Cyan, Magenta, Yellow, (C, M, Y). At block 2, the color image is projected onto a base pattern set, representing the component pattern that will be used, perhaps R, G, B, C, M, Y, W (white) and K (black) Next, at step 4, the component patterns for each of the colors in the basis set except white are generated, based on intensity of the color. At step 6, wherever a color is defined in terms of a non-printing color, that color must be redefined in terms of a printing color. Finally, at step 8, all of the defined colors are combined, so that the patterns for a given printing color represent the colorant required. Initially considering block 2, to generate a pattern while still preserving the color, the method projects the original color onto a basis color set. The basis colors are used in the component patterns. The basis color set might, for example, be the eight colors cyan, magenta, yellow, red, green, blue, black and white, and projection onto this basis will be described, but other colors could be used.

Now referring to the block 2 of the process, initially the white component of the overall color combination is separated out. Thus, instead of printing pink, a pattern of red and white is generated at block 4. For a color expressed in additive red-green-blue coordinates (r, g, b), the amount of white present is the minimum of the coordinate values $$w=\min(r, g, b).$$

The remaining color with the white component removed is $$r'=r-w \quad g'=g-w \quad b'=b-w.$$

Figure 2A:
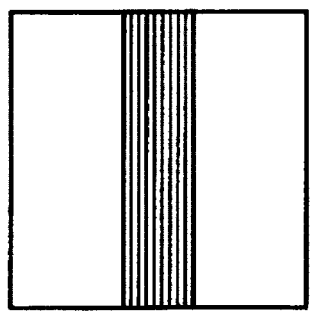
FIGS. 2A and 2B illustrate the basic principle of the invention, that different densities can be modeled by certain repeatable patterns.
Figure 2B:
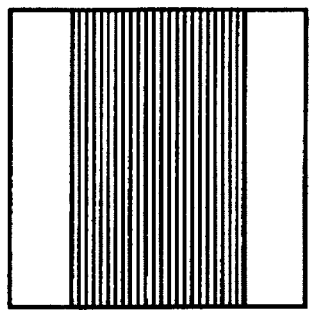

When copied the red (for example) will become black, the white will remain white, and a pattern will be reproduced. The separation is carried out in block 4 in a pattern cell, which is then replicated to cover the colored area. The pattern cell can be any shape that can be tiled, but a rectangular shape is simplest. One could, for example, use a square for the pattern cell and draw the red component of the color in the shape of a vertical stroke, with the width of the stroke reflecting the amount of red present in the color. Light pink would have a thin red stroke while a stronger pink would have a wider stroke, as shown in FIGS. 2A and 2B. To faithfully reproduce a full strength red, the entire (or nearly the entire) pattern cell is filled.

Figure 3A:
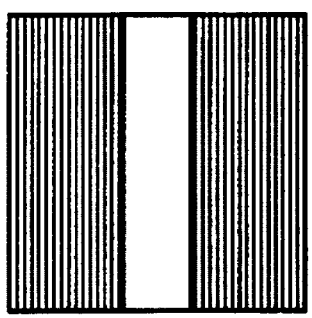
FIGS. 3A and 3B are examples of a different pattern particularly useful for strong colors.
Figure 3B:
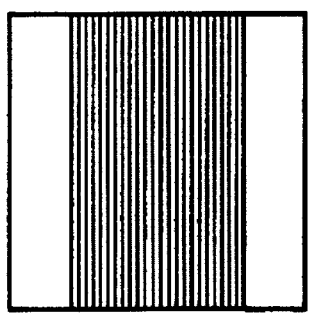

If this is done, it will create a uniform area with no distinguishing pattern; it will just look black when copied on a black and white copier. To preserve some texture, even for full reds, you can either limit the extent of the stroke width to not quite consume the entire cell, as in FIG. 3A or add a white texture within the red stroke when it becomes thick, as shown in FIG. 3B. By placing the white line at the position where the pattern comes together to fill the cell the intensity jump that would occur if the line is introduced suddenly is avoided.

Figure 4A:
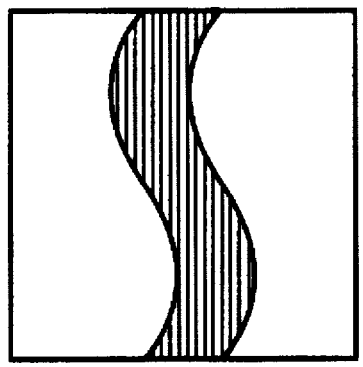
FIGS. 4A, 4B and 4C illustrate patterns for each of the primary colors, R, G and B
Figure 4B:
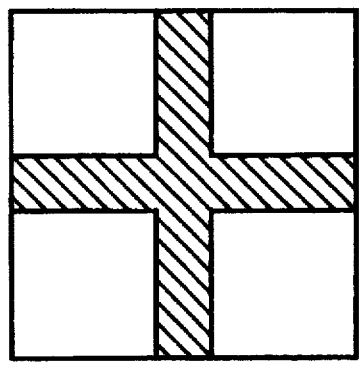
Figure 4C:
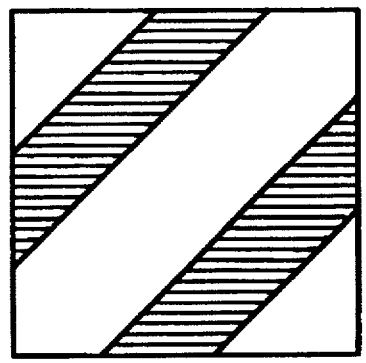

Patterns of vertical and horizontal stripes can be used, and were used in initial implementations of the method, but were found to be too obvious, and tended to interfere with and detract from the image. It was found that a more pleasing pattern is formed by an S shaped curve, shown in FIG. 4A. This curve is joined from cell to cell to make vertical waves rather than stripes. Other pattern shapes used are the cross for green in FIGS. 4B, and diagonal stripes for blue, as shown in FIG. 4C. It will be appreciated however, that many different patterns are possible, each having its own benefits.

The idea of separating the white from the color and using both to form a pattern works well for light unsaturated colors, but dark colors of a certain hues may have little white and differ from one another by the amount of black present. To make black-and-white copies of these colors look different you need to change the pattern with the amount of black present. The black amount is given by:

$$k = 1 - \max(r, g, b).$$

Figure 5A:
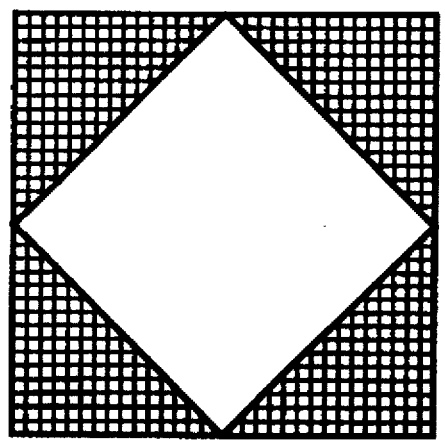
FIGS. 5A and 5B illustrate patterns for black (sometimes, K)
Figure 5B:
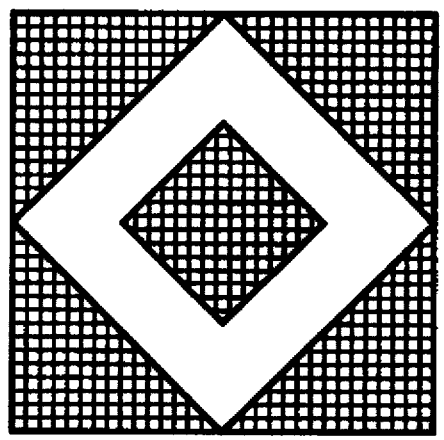

This differentiation of dark colors can be made by giving black its own shape that grows or shrinks with the amount of black present. Thus the pattern will be composed of a combination of shapes including the shape for the primary color (red, green or blue) and the shape for black. A possible shape for the black content could fill the corners of the pattern cell with black triangles, as shown in FIG. 5A. This gives a diamond shape when the cell is replicated. A reason for choosing this shape is that there is little overlap with the patterns for other colors until the amounts of color or black become large. However, this pattern was found to appear too coarse for grays. Better results were obtained using a finer pattern produced by the addition of a diamond in the center, as shown in FIG. 5B. Other patterns may be possible.

Figure 6A:
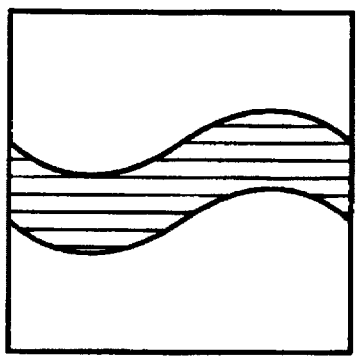
FIGS. 6A, 6B and 6C illustrate patterns for the colorant or secondary colors, C, M and Y.
Figure 6B:
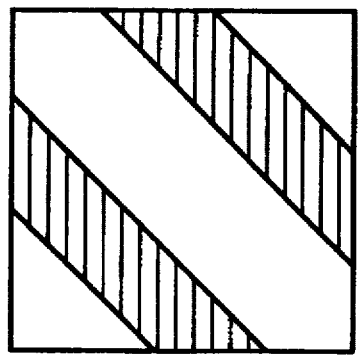
Figure 6C:
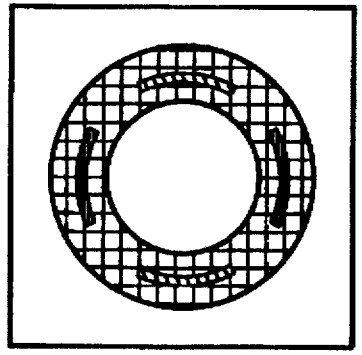

Removing the white component from a color reduces at least one of the r, g, b coordinates to zero, so one might consider making the pattern from the shapes for the other two components and black. However, with this approach the shapes will interfere with one another for many of the colors. The reason is that both shapes can fill out most or even all of the pattern cell and are therefore bound to overlap. The worst cases are the secondary colors (cyan, magenta, and yellow) that require both of the component primaries to completely fill the cell, giving total overlap. We can use smaller shapes and reduce their interference if we use shapes for a primary and a secondary color instead of for two primaries. For example, orange can be made from red (r') and a smaller amount of green (g') but we could combine the green with an equal amount of red to make yellow. The orange would then be formed from the yellow (y=g') and the remaining red (r"=r'-g'). The overall area of the pattern cell that must be colored becomes r'=r"+y rather than r'+g'. This makes it easier to fit in all of the shapes. The strategy then is to fill a pattern cell with a shape for the primary color, one for the secondary color, and one for black, with the remainder of the cell white. This requires that shapes be defined for the secondary colors. One approach is to borrow the shapes from the primaries that form the secondaries. However, it was found that better color differentiation could be obtained by using distinct and different patterns for the secondary colors. The criterion in pattern selection was the minimization of overlap between primary and o secondary patterns that can coexist. A pattern set that works well is the horizontal wave for cyan, diagonal stripes for magenta, and a circle for yellow, as shown respectively in FIGS. 6A, 6B and 6C.

Figure 7A:
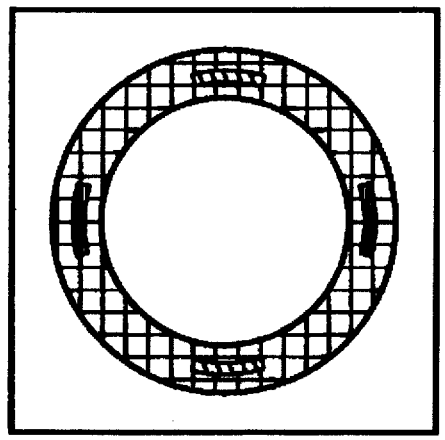
FIGS. 7A and 7B illustrate how increasingly strong yellow colors are treated.
Figure 7B:
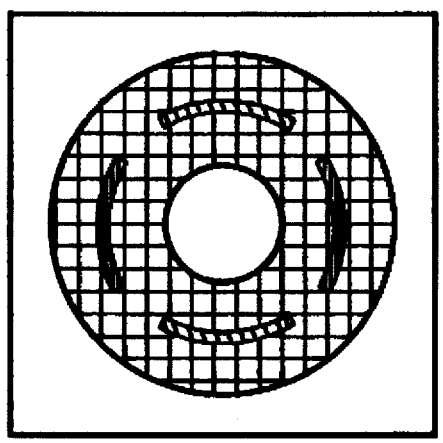

As with the primaries, the secondary shapes can expand to fill the cell. To preserve the pattern when this happens, a thin white path is drawn in the center of the shape for cyan and magenta, similar to that illustrated previously at FIG. 3A. Yellow is too light for a white line to be visible, so in this case a black line can be used. If a solid black line makes the resulting yellow too dark, a dashed black line can be used, or a line composed of red and green dashes, as shown in FIGS. 7A and 8B. Since yellow usually copies as white, some method is needed to distinguish light yellow from strong yellow. One way is to increase the length of the center dashes with increasing strength of the yellow.

A summary of the calculation of the amounts of primary and secondary colors follows. If colors are originally expressed as additive red, green, and blue (R G B) ranging between 0 and 1, then the calculations are:

$$
\begin{aligned}
k &= 1 - \max(R, G, B) \\
w &= \min(R, G, B) \\
r_t &= R - w \\
g_t &= G - w \\
b_t &= B - w \\
c &= \min(g_t, b_t) \\
m &= \min(r_t, b_t) \\
y &= \min(g_t, r_t) \\
r &= r_t - m - y \\
g &= g_t - y - c \\
b &= b_t - c - m
\end{aligned}
$$

where the values r, g, b, c, m, y, k give how much area of the pattern cell should be given the respective color.

If the colors are originally expressed in the subtractive cyan, magenta, yellow and black (C M Y K) ranging between 0 and 1, then the pattern color amounts are calculated as follows:

$$
\begin{aligned}
k_t &= \min(C, M, Y) \\
k &= K + k_t \\
c_t &= C - k_t \\
m_t &= M - k_t \\
r &= \min(m_t, y_t) \\
g &= \min(c_t, y_t) \\
b &= \min(m_t, c_t) \\
c &= c_t - g - b \\
m &= m_t - r - b \\
y &= y_t - r - g.
\end{aligned}
$$

Note that the pattern cell can contain up to three patterns for any given color, the primary color, the secondary color, and black. Because these patterns share the same cell there will be some overlap; and the color on top will replace the color beneath it. The actual inks for the hidden pattern to will be less than desired and a color shift will occur. For example, if one is producing orange, part of the red will be in conflict with the yellow and there will be a color shift from the desired state where both are shown. The simplest strategy for handling this color shift is to include compensating adjustments in the colors requested. These compensations can be included in the color correction process, which should occur prior to the halftoning step.

If, however, for some reason there is no color correction, or it cannot include the adjustment needed, the adjustments can be explicitly carried out on the color values. The solution is to extend the width of the primary shape (the red wave)

to compensate for the overlapping area and then print the secondary color (yellow) wherever them is a conflict. The same can be done for black. When either primary or secondary overlap the black, the black can be extended and the primary or secondary color can be used in the overlap region. The adjustment need only take place on those colors that may be "covered" by other colors.

If, for example, the model is that black is placed first, followed by a color from the set (cyan, magenta, or yellow) and last a color from the set (red, green, or blue), then the second color must be adjusted for the last, and lack must be adjusted for both. The adjustments have the form:

$$c = c + A_{cg}(c,g) + A_{cb}(c,b)$$
$$m = m + A_{mr}(m,r) + A_{mb}(m,b)$$
$$y = y + A_{yr}(y,r) + A_{yg}(y,g)$$
$$k = k + A_{kcg}(k,c,g) + A_{kcb}(k,c,b) + A_{kmr}(k,m,r) + A_{kmb}(k,m,b) + A_{kyr}(k,y,r) + A_{kyg}(k,y,g).$$

The functions $A_{ij}$ give the incremental adjustment to the second color i due to the presence of the last color j. The functions $A_{kij}$ give the incremental adjustment of black due to the presence of both colors i and j.

If the patterns overlap in some easily modeled fashion, then the adjustment terms may be calculated on-the-fly. Otherwise, the adjustments can be precalculated and stored in a table. Small tables and interpolation may be used to save storage space. Optimal corrections depend not only on the design of the pattern, but also the marking characteristics of the printing device. Even with rather rough corrections, fairly good color correspondence can be obtained between a wide set of original colors and their expression as patterns.

The first step in the process is the calculation of the weights or amounts of each of the plurality of colors in the basis color set as described above. These amounts may be adjusted for anticipated overlap of the patterns. The second stage is the actual generation of the component patterns.

This method of generating colored patterns is algorithmic; that is, there is an algorithm that generates a pattern for any color. The method is not limited to some small set of patterns, or a particular palette of colors. Also, similar colors have similar patterns. This means that sweeps of colors become smoothly changing textures without abrupt changes in the patterns In selecting a pattern size the pattern cell must be large enough to see, yet small enough to fill small objects and to be inoffensive. For copiers, a cell size of 1/24 inch seems to work well. For faxing, however, the reproduction quality is poorer and a larger pattern cell of at least 1/16 inch is needed.

In implementing the above principles, one approach is to make use of the pattern capability of Adobe PostScript Level II. (A product of the Adobe Corporation, California) The operators for filling graphical objects were redefined such that they first extract the current color, construct a corresponding pattern and install the pattern for rendering, and finally fill the graphic shape. A similar approach might be taken at the Microsoft Windows Graphics Device Interface (GDI), replacing colors with patterns by using the bitmap and brush operations. An advantage of this PDL approach is that it is fairly simple to implement. One need only insert a header that redefines the operators at the beginning of the PostScript document. The disadvantage of this approach is that it may be slow for some images. An example of this implementation is illustrated at APPENDIX Section 1.

A more efficient implementation is based on halftoning and also has a simple implementation, but requires modification of rendering software. The main idea, as explained below, is to not only halftone the ink colors (cyan, magenta, yellow, and black) but all of the basis colors (including the secondary colors red, green, and blue). The halftones construct the pattern shapes for these colors. The inking bitmaps are then constructed by combining the appropriate primary and secondary patterns with logical operations in the third and forth steps. In the PostScript implementation, this process, which includes the separation of the pattern colors into the colorant set and the combination of those contributions for each particular colorant, is implicitly carried out by the PostScript pattern machinery. But for the halftone approach it must be carried out explicitly.

The halftoning is a conventional process where the color values (r, g, b, c, m, y, or k) are compared to a halftone threshold value for that position in the image. For example where r(x, y) is the red color value at position (x, y), $T_r$ is the threshold array for red, mod is the modulus operator, m, n are the dimensions of the pattern cell, and $\beta_r$ is the resulting bit value for the red pattern then the halftoning process is described by:

if r(x, y) > $T_r$ (x mod m, y mod n)
then $\beta r = 1$
else $\beta r = 0$

Similar tests are made for all the other colors.

The threshold arrays are designed so that as the amount of ink increases, the basic pattern is drawn and then thickened. For example, if the pattern cell size were 4 by 4, color values varied between 0 and 1, and the pattern were a vertical stripe, then the threshold array might look as shown:

| 17/32 | 1/32 | 9/32  | 25/32 |
| 21/32 | 5/32 | 13/32 | 29/32 |
| 19/32 | 3/32 | 11/32 | 27/32 |
| 23/32 | 7/32 | 15/32 | 31/32 |

The next steps, represented at blocks 6 and 8 in FIG. 1, is to combine the patterns. In block 6 the color patterns are separated into the corresponding contributions for the actual colorants. For example, the pattern for the red basis color will actually be produced by printing yellow and magenta colorants. Similarly, green is produced from yellow and cyan colorants and blue is produced from cyan and magenta colorants. Thus the red pattern is actually used twice, once for the yellow separation and once for the magenta.

In accordance with the process implemented at block 8, once we have the colorant (cyan, magenta, yellow and black) separations for all of the basis color set patterns, they can be combined to produce the actual colorant controls. For example, the cyan specifications form the cyan, blue and green patterns must all be combined by logical operations in order to produce the overall control pattern for the cyan colorant. This combination operation is described below. The V symbol indicates the logical disjunction of the bit patterns.

$$\beta_c = \beta_c \lor \beta_b \lor \beta_g$$
$$\beta_m = \beta_m \lor \beta_r \lor \beta_b$$
$$\beta_y = \beta_y \lor \beta_g \lor \beta_r$$

It may be desirable to explicitly remove the areas where colors overlap with black. You can choose for either the black or color to come out on top, and exlicitly controlling the outcome also avoids the excess ink that would occur if both were printed. The $\land$ and $\neg$ indicate conjunction and negation respectively. Removing the overlapping color from black would be done as follows:

$$\beta_k = \beta_k \land \neg \beta_c \land \neg \beta_m \land \neg \beta_y.$$

The bitmaps $\beta_k$, $\beta_k$, $\beta_m$, $\beta_y$, are then used to control ink marking.

One may wish to include additional white or black areas as part of the pattern, such as white or black lines down the center of the colored areas to preserve the pattern in cases where the color expands to fill the cell. Auxiliary white and black areas can be introduced by further halftoning and logical operations. Suppose, for example, one wished to draw a vertical white line in the center of the pattern when there are large amounts of color i. The white line can be constructed by a halftone cell. The cell threshold would be compared to values for color i and would be set such that the line does not occur until there is sufficient amount of the color for its background, as in the following cell:

| 1 | 3/4 | 1 | 1 |
| 1 | 3/4 | 1 | 1 |
| 1 | 3/4 | 1 | 1 |
| 1 | 3/4 | 1 | 1 |

If the threshold array for white on color i (i=r, g, b, c, m, y or k) is called $T_{wi}$, the halftoning test then generates bit values $\beta_{wi}$. The overall white is the combination of all white patterns.

$$\beta_w = \beta_{wr} \vee \beta_{wg} \vee \beta_{wb} \vee \beta_{wc} \vee \beta_{wm} \vee \beta_{wy} \vee \beta_{wk}$$

The white bits must be removed from the adjusted primary ink patterns $$\beta_c = \beta_c \wedge \neg \beta_w$$
$$\beta_m = \beta_m \wedge \neg \beta_w$$
$$\beta_y = \beta_y \wedge \neg \beta_w$$
$$\beta_k = \beta_k \wedge \neg \beta_w$$

Black areas can be generated by halftone patterns in just the same way as white areas. In this case the resulting areas would be given by $\beta_{ki}$ (i=r, g, b, c, m, y). The overall additional black area would be $$\beta_{k0} = \beta_{kr} \vee \beta_{kg} \vee \beta_{kb} \vee \beta_{kc} \vee \beta_{km} \vee \beta_{ky}$$

This must be added to the black and removed from the other colors.

$$\beta_c = \beta_c \wedge \neg \beta_{k0}$$
$$\beta_m = \beta_m \wedge \neg \beta_{k0}$$
$$\beta_y = \beta_y \wedge \neg \beta_{k0}$$
$$\beta_k = \beta_k \vee \beta_{k0}$$

Note that black is chosen when black and colored areas overlap, then combine the regular black $\beta_k$ with the auxiliary $\beta_{k0}$ prior to removing the black overlap regions from the other colors.

Figure 8:
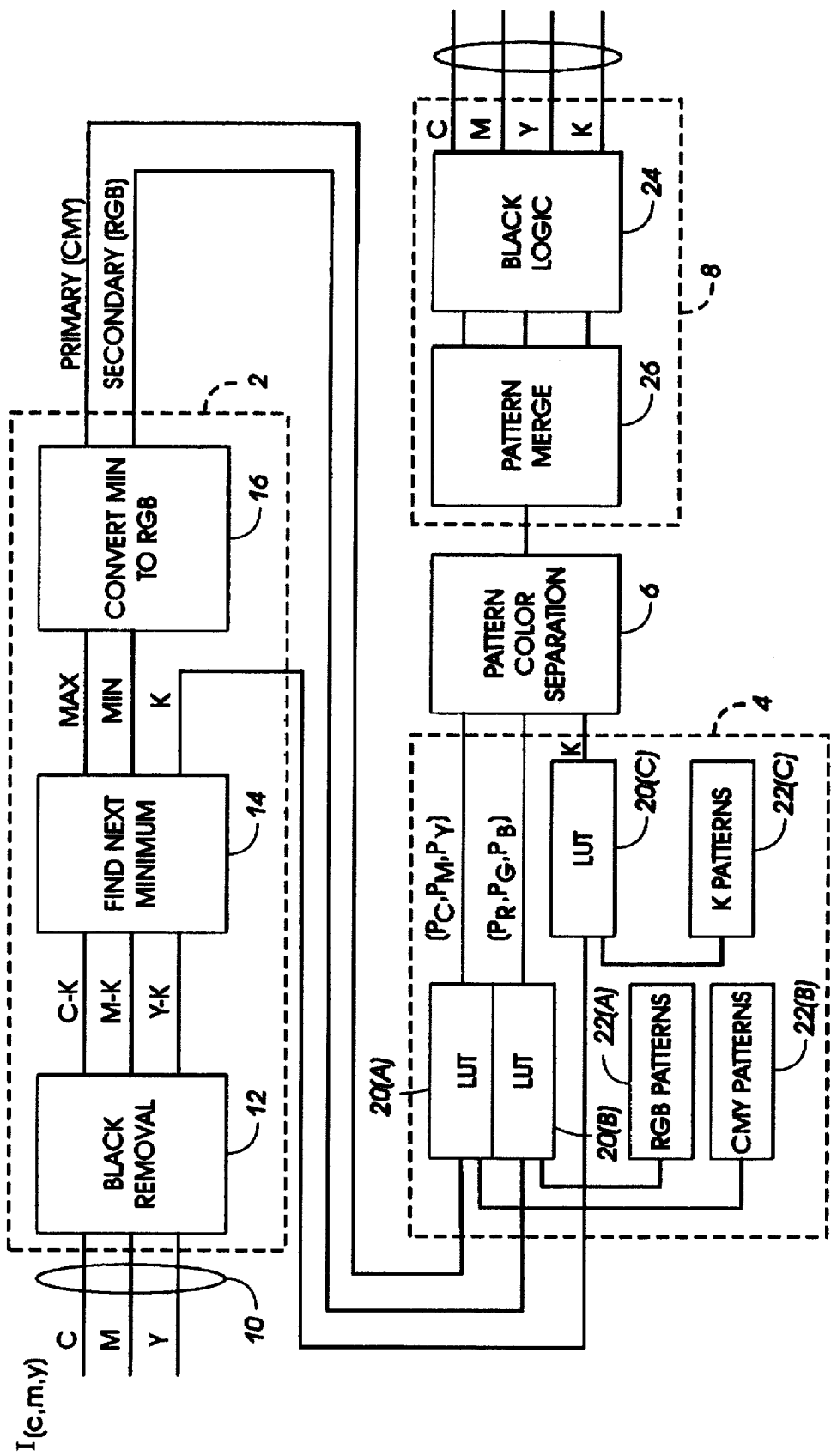
FIG. 8 shows a functional block diagram of a way that the invention may be implemented, using look up tables for the patterns'

Referring now to the drawings where the showings are for the purpose of describing a preferred embodiment of invention and not for limiting same, a basic functional diagram of the invention of a system for carrying out the present invention is shown in FIG. 8. For one example embodiment, we assume that an image has been generated in colorant space, in terms of cyan, magenta and yellow (CMY space), perhaps by one of the methods described in U.S. Pat. No. 5,528,386 to Rolleston et al., or U.S. Pat. No. 5,483,360 to Rolleston et al., wherein images originally represented in device independent color space by an image creator or imaging device are converted to device dependent or colorant space. The image is originally represented in terms of a plurality of separations, perhaps three or more, and in this case, by a cyan separation, a magenta separation and a yellow separation. For the purposes of discussion, it can be assumed that this image is already color-corrected. Each pixel in each separation, can be either a gray level or multiple level image signal representing an amount of colorant between a minimum or white level and a maximum colorant level.

Initially, upon receiving the signals at a system input, generally indicated as 10, the black component of a color value is removed from the signals. The black component is usually equal to the minimum signal value among corresponding pixels in each separation. Corresponding amounts of colorant, where k=min(c, m, y) are removed, reducing the minimum signal value to zero. Now, the image is defined as the combination of two colors. This step is accomplished at a black removal element 12, which detects the minimum, and then subtracts the detected minimum from each signal. The output of this device will be two colors, a zero signal and a black signal K, equal to the minimum value detected.

At this point, we begin to build multiple overlapping patterns to generate the image. Initially, each pattern is built up in each separation by reproducing pattern repetitions of areas of a size of between of about 1/25"×1/25", or between 3×3 to 20×20 pixels, depending on the resolution of the printer at which printing will be desired. Each pattern has a colored portion and a white portion. That ratio of colored portion to white portion gives each pattern repetition its luminance response. However, for many important colors, 100% coverage is required, reducing the amount of luminance differential in the repeated patterns. Thus, instead of reproducing with each of the remaining colorants, shapes representing primaries (r,g,b) and secondaries (c,m,y) are used.

The next step in the process is to find out which of the two remaining colors is larger. Labeled as 14, the two color minimum detector is used to find the minimum of the two remaining colors. The minimum or secondary color value is then converted to an r, g, b value at converter 16. The maximum value less the minimum value is maintained as a c, m, y value. Black is maintained as the black value. Adjustments for pattern overlap can also be carried out at this point if they have not been factored into the color conversion process. Color conversion from c, m, y is a well known process, described, for example, in U.S. Pat. No. 5,528,386 to Rolleston et al., or U.S. Pat. No. 5,483,360 to Rolleston et al.

Figure 9:
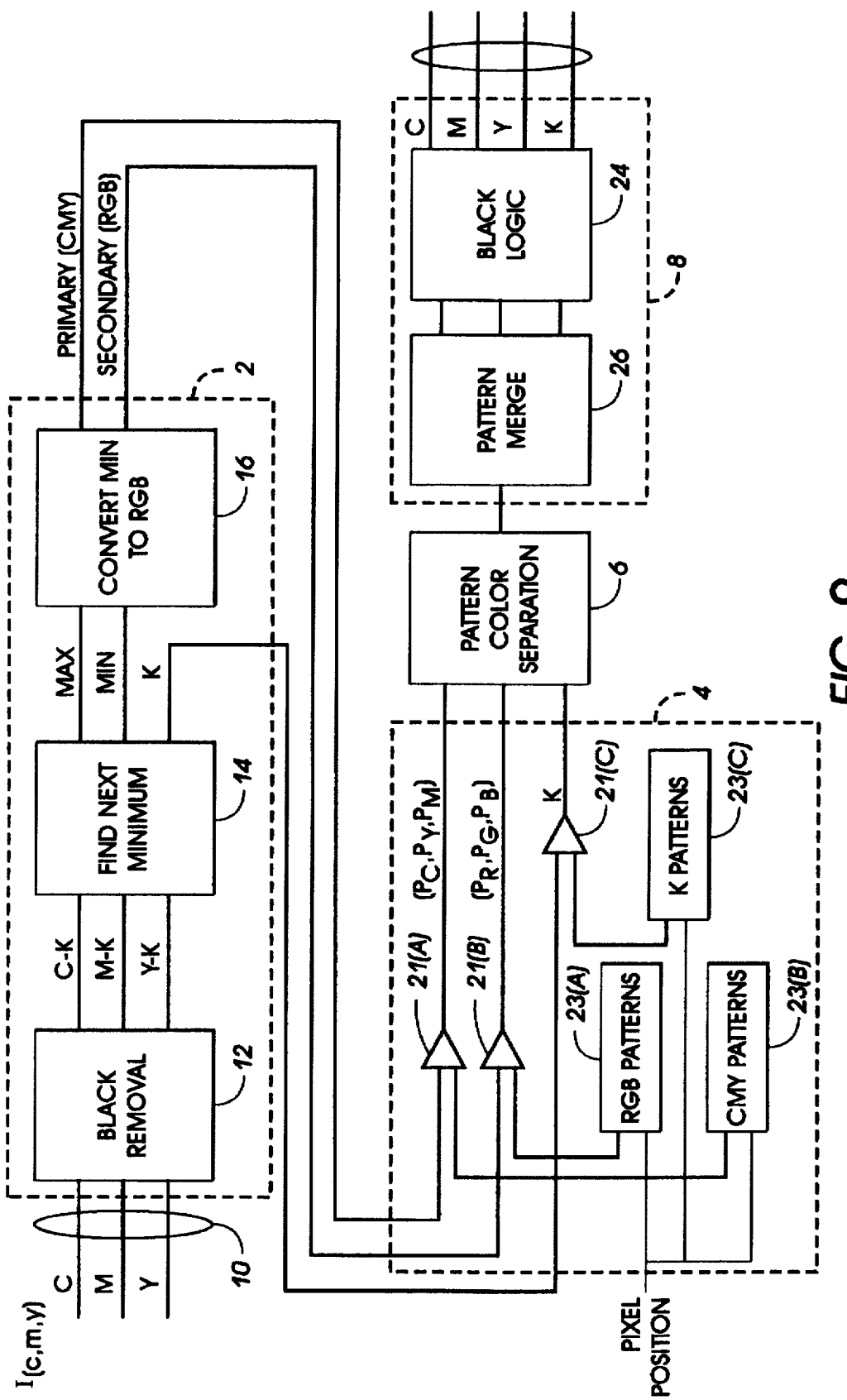
FIG. 9 shows a functional block diagram of an implementation of the invention, where the patterns are generated by screening or dithering.

In the next step, the value of the min, max and black signals are used to determine a pattern, at LUT tables 20a, 20b and 20c. The lookup tables receives an input value representing the gray level C, M, Y value, a value representing the gray level R, G, B and the black value. The LUT outputs a pattern based on stored pattern information from pattern memories 22a, 22b and 22c that is related to 1) the color, and 2) the density desired. One could also select individual pixels from the pattern by also specifying pixel location modulo the pattern size. In an alternative arrangement, illustrated in FIG. 9, this process can be implemented using a somewhat standard screening process, with screen values loaded to comparators 21a, 21b, and 21c in place of the LUT's, and selected by pixel location, modulo the pattern size, from screen pattern memories 23a, 23b and 23c.

The next step at block 26 is to separate the colors of the patterns according to the colorants actually used in the printing apparatus. Patterns contributing to a colorant are combined for each colorant. The image data is now reproducible in pattern format, however, it is highly desirable to avoid overprinting black and color. Accordingly, black logic 24 is applied to prevent two pixels being generated at the same location by the color pattern signals and the black pattern signals.

Figure 10:
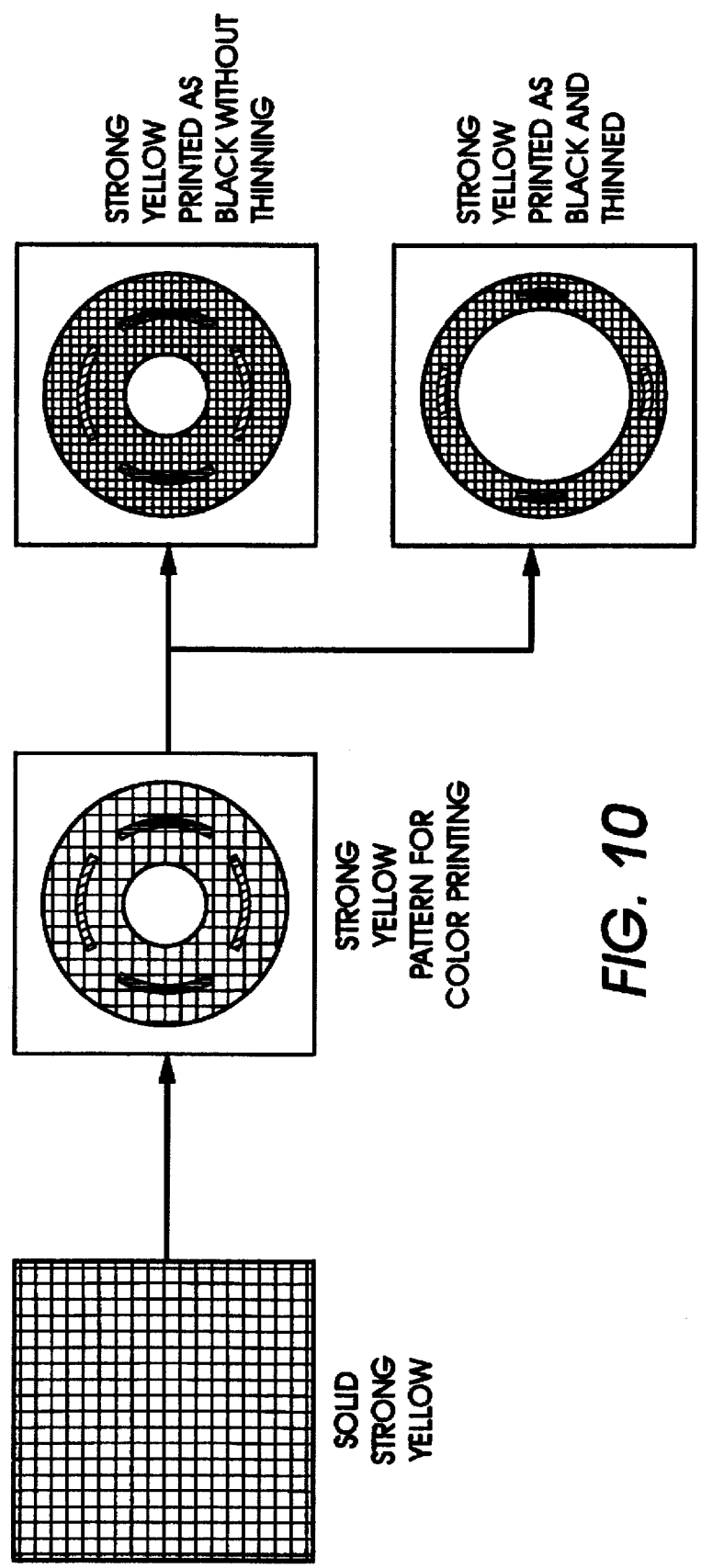
FIG. 10 shows a variation in pattern usage when the patterns are printed directly to black.

In an alternative process, rather than printing the patterns with respective colored inks, the patterns may be printed in black ink directly for copying. In such a case, the image is generated as described above, but each signal is added at the output, to provide a driving signal for a black only printer. Many of the advantages of the invention are retained. It is contemplated that a user interface command may be available to control a color printer to print black only in this scenario. It should be noted that, in such cases, a different set of patterns, which are thinner in nature must be used, so that when a thick, low density signal color area is printed (for example, bright yellow), which would be printed as a solid black area is encountered, the new patterns (as shown perhaps in FIG. 10) provide a lower density level for reproduction.

The disclosed method may be readily implemented in software using object oriented software development environments that provide portable source code that can be used on a variety of computer or workstation hardware platforms.

Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

APPENDIX

Section 1

```
        %!

%----------------------------------------
        % BLACK-AND-WHITE FRIENDLY COLOR HEADER
        % Created by Steve Harrington and Jean Taber
        % Last modified Jan 12, 1996
        % This version modified Sept. 16, 1996
        Copyright Xerox Corporation, 1996. All rights reserved.

%----------------------------------------
        % Black-and-White Friendly Color provides rendering of a document so as to preserve
        % color information should the document be copied on a black-and-white device.
        % It does this by redefining the PostScript rendering operators.
        % For solid areas the idea is to print colors using a texture pattern.
        % When copied the colors disappear, but the patterns remain. This is done by
        % redefining the operators "rectfill", "fill", "cofill", "ufill" and ueofill. When
        % one of these operators is called it looks up the current color and uses the color
        % to generate a texture pattern. This pattern is then installed as the current
        % color and the fill proceeds. When the fill is completed the original color is
        % restored. Note that objects constructed from a large number of fills can result
        % in a large number of pattern constructions which can slow things down.

        %----------------------------------------

%------
        % define some useful parameters
        %------
30      /patterncellsize 3 def    % controls the coarsness of the pattern

%--------UTILITIES---------

        /currentrgbdecodecolor
        %------
        % This procedure is an alternative to currentrgbcolor that does reasonable things
        % when the device independent color spaces are used.
40      % It's pretty dumb in that it just treats CIABasedABC as if it were RGB
        % with no conversions.
        % And for CIEBasedA it just duplicates the parameter twice for the RGB values.
        % PostScript should do the right thing for the device dependent spaces.
        % There is a setrgbcodecolor operator to set values extracted this way
45      %------
```

```
    { currentcolorspace    % determine what color space we must deal with
      0 get                % we get an array with name and parameter, keep the name dup /CIEBasedABC eq  % dup the name so we dont lose it and see if its ABC
      {                    % assume rgb in disguise for now
        pop currentcolor}  % if so pop the name and get the ABC values
      { dup /CIEBasedA eq  % if not see if its CIEBased A
        {                  % assume gray linear for now
          pop currentcolor % pop the name and get the A value
          dup dup }        % dup twice to get values for r, g and b
        {                  % anything else use device rgb or black
            pop currentrgbcolor }
        ifelse
      } ifelse
    ) bind def /setrgbcodecolor
    %------
    % This procedure is an alternative to setrgbcolor that does reasonable things
    % when the device independent color spaces are used.
    % It's pretty dumb in that it just treats CIABasedABC as if it were RGB
    % with no conversions.
    % There is a setrgbcodecolor operator to set values extracted this way
    %------
    {currentcolorspace    % determine what color space we must deal with
     0 get                % we get an array with name and parameter, keep the name
     /CIEBasedABC eq      % at this time we only support ABC or RGB
     {setcolor}
     {setrgbcolor}
     ifelse
    } bind def /buildpattern
    %------
    % takes rgb and constructs a pattern in unit square
    % the pattern can be used for filling polygons
    % the operator expects r,g,b values on the stack
    %------
    {
     <<                   % set up dictionary of local variables
     4 1 roll             % roll the r, g, b values past dictionary marker
     /rcorpat 4 1 roll    % position them as value to variables
     /gcorpat 3 1 roll
     /bcorpat exch
     /ccorpat 0           % we will calculate and save values for c, m, y, k, w
     /mcorpat 0
```

```
    /ycorpat 0
    /kcorpat 0
    /wcorpat 0
    /rwcorpat 0        % pattern width parametes fro the various colors
    /gwcorpat 0
    /bwcorpat 0
    /cwcorpat 0
    /mwcorpat 0
    /ywcorpat 0        % thickness of circle used for complete yellow pattern
10  /koffset 0
    /go1 0
    /go2 0
    /yo1 0
    /yo2 0
15  /co1 0
    /co2 0
    /thickenough 0.0
    /twcorpat 0.02
    /steps 16
    /halfstep 0.5 16 div
    /quarterstep 0.25 16 div
    /stepssq2 16 0.71 div
    /swcp 0   % used to calculate the fraction of steps to be imaged in a pattern
    /nwcp 0   % used for integer number of steps to be imaged
25  /tln 0    % used to calculate the fraction of step and corresponding lengths
    /bw1 0    % thickness parameter for blue partial pattern
    /l1b 0    % lengths for the blue partial pattern
    /l2b 0
    /l3b 0
    /l4b 0
    /tln 0
    /mw1 0    % thickness parameter for magenta partial pattern
    /l1m 0    % lengths for magenta partial pattern segments
    /l2m 0
    /l3m 0
    /l4m 0
    /gw1 0    % thickness parameter for green partial pattern
    /l1g 0    % lengths for the green partial pattern
    /l2g 0
    /l3g 0
    /l4g 0
    /rw1 0    % thickness parameter for red partial pattern
    /l1r 0    % arclengths for the red partial pattern
    /l2r 0
    /l3r 0
    /l4r 0
    /cw1 0    % thickness parameter for cyan partial pattern
    /l1c 0    % arclengths for the cyan partial pattern components
    /l2c 0
    /l3c 0
```

```
      /l4c 0
      /yw1 0    % thickness of partial yellow pattern
      /l1y 0    % length of partial arc for partial yellow pattern
      /kw1 0    % size parameter for black partial pattern
      /l1k 0    % side length adjustments for the black partial pattern
      /l2k 0
      /l3k 0
      /l4k 0
      /l5k 0
10    /l6k 0
      /l7k 0
      /l8k 0

>>
15    begin
      gsave
      twcorpat setlinewidth
      0 setlinecap
      2 setlinejoin
20

% set wcorpat to min (the amount of white in the color),
      % set kcorpat to 1 - max (the amount of black in the color)
      rcorpat gcorpat gt { /kcorpat rcorpat def /wcorpat gcorpat def } {/kcorpat gcorpat def /wcorpat rcorpat
25    def } ifelse
      bcorpat kcorpat gt { /kcorpat bcorpat def } if
      bcorpat wcorpat lt { /wcorpat bcorpat def } if
      /kcorpat 1 kcorpat sub def 30    % remove white from rgb
      /rcorpat rcorpat wcorpat sub def
      /gcorpat gcorpat wcorpat sub def
      /bcorpat bcorpat wcorpat sub def 35    % calculate secondary color
      gcorpat bcorpat gt { /ccorpat bcorpat def } { /ccorpat gcorpat def } ifelse
      rcorpat bcorpat gt { /mcorpat bcorpat def } { /mcorpat rcorpat def } ifelse
      rcorpat gcorpat gt { /ycorpat gcorpat def } { /ycorpat rcorpat def } ifelse 40    % remove secondary color from primary
      /rcorpat rcorpat mcorpat ycorpat add sub def
      /gcorpat gcorpat ycorpat ccorpat add sub def
      /bcorpat bcorpat ccorpat mcorpat add sub def 45    % in the Adobe PostScript implementation patterns don't grow smoothly
      % for example if the pattern is a horizontal line if the width of the line
      % is continuously increased, the width of the rendered pattern will increase
      % in discrete steps.
      % this can cause jumps in intensity of the pattern causing contours in sweeps
50    % To work around this we can make the pattern with a full horizontal line at
```

-25-

```
     % one width and a partial line on top of it at a thicker width.
     % instead of thickening the line we increase the length of the thicker piece.
     % we thicken until it fills the length of the cell then start a new thicker line
     % This idea is done for all the patterns, so they need two width and also
5    % lengths for the thicker partial patterns.
     % Some pattern are made of several lines so we need lengths for all pieces.
     % Also a line can be thickened on just one side, and then on the other side.

%-------------
10   % calculate the cyan pattern parameters
     % begin by calculating a width to use for the cyan pattern
     % c, m, and y are laid down last so no compensation is needed for other colors /cwcorpat ccorpat def
15
     % scale the total number of steps to fill cell by
     /swcp steps cwcorpat mul def     % the fraction of the cell to be colored
     /nwcp swcp floor def     % the integer part is how many complete steps are drawn
     /tln swcp nwcp sub def    % fractional part is used for the next partial pattern
20   /cwcorpat nwcp halfstep mul def    % parameter needed is half stroke width
     /cw1 nwcp 1 add halfstep mul def    % and half width of larger partial stroke % Next we need the lengths for the partial pattern components
     % The cyan pattern is a squiggle made from two arcs of 120 degrees
25   % We can increase the width on both sides of both arcs
     % so there is 480 degrees to play with
     /tln tln 480 mul def    % set the total length amount (in degrees for cyan)

% now break this up into the length of the four strokes
30   % no arc length can be more than 120 degrees
     /l1c tln 120 2 copy gt {exch pop} {pop} ifelse def
     /tln tln l1c sub def
     /l2c tln 120 2 copy gt {exch pop} {pop} ifelse def
     /tln tln l2c sub def
35   /l3c tln 120 2 copy gt {exch pop} {pop} ifelse def
     /l4c tln l3c sub def %-----------
40   % calculate the yellow pattern parameters
     % begin by calculating a width to use for the yellow pattern
     % yellow is a circle and as its thickness increases it exceeds the square cell
     % we use a quadratic function to increase thickness faster as cell fills
     % yw = 0.3y + 0.45y*y
45   /ywcorpat 0.3 ycorpat mul 0.45 ycorpat dup mul mul add def % scale the total number of steps to fill cell by
     /swcp steps ywcorpat mul def    % the fraction of the cell to be colored
     /nwcp swcp floor def     % the integer part is how many complete steps are drawn
50   /tln swcp nwcp sub def   % fractional part is used for the next partial pattern
```

```
        /ywcorpat nwcp steps div def   % stroke width of complete yellow circle
        /yw1 nwcp 1 add steps div def  % storke width of larger partial arc % length of the partial arc is its fraction of a full circle (360 degrees)
  5     /l1y tln 360 mul def %------------------
 10     % calculate parameters for the magenta pattern
        % magenta uses two 45 degree lines
        % the step width is increased by sqrt(2) for 45 degress and halved for 2 lines
        /mwcorpat 0.71 mcorpat mul def 15     %new magenta growth
        % scale the total number of steps to fill cell by square root 2 for diagonal and
        /swcp stepssq2 mwcorpat mul def   % the fraction of the cell to be colored
        /nwcp swcp floor def       % the integer part is how many complete steps are drawn
        /tln swcp nwcp sub def    % fractional part is used for the next partial pattern
 20     /mwcorpat nwcp quarterstep mul def  % half width for each line is 1/4 total step
        /mw1 nwcp 1 add quarterstep mul def  % half width for thicker partial pattern % tln was scaled to the proper length coordinates above
        % now we must separate it into for segments (each side of each line)
 25     % we will grow each line from center out in two directions so we want
        % a half length value.
        % since the lengths (l1m etc) are x and y offsets there is no sqrt(2) factor
        % on the longer (inside) side of the stroke we add the width to the length
        % to cover diagonal cut of line by cell boundary
 30     /l1m tln 0.25 mwcorpat add 2 copy gt {exch pop} {pop} ifelse def
        /tln tln l1m sub def
        % for the shorter (outside) side of the stroke we can subtract the width
        /l2m tln 0.25 mwcorpat sub 2 copy gt {exch pop} {pop} ifelse def
        /tln tln l2m sub def
 35     /l3m tln 0.25 mwcorpat add 2 copy gt {exch pop} {pop} ifelse def
        /l4m tln l3m sub def 40     %--------------
        % calculate parameters for red
        % the red pattern is a squiggle made from two arcs
        % red is draw before magenta or yellow so these can partially obscure it.
        % to compensate we increase the red width if there is yellow or magenta
 45     % the heuristic used is rw = r / max(0.1, 1 - 2*y - m)
        /rwcorpat rcorpat 1 ywcorpat 2 mul mwcorpat add sub dup 0.1 lt {pop 0.1} if div def % scale the total number of steps to fill cell by
        /swcp steps rwcorpat mul def    % the fraction of the cell to be colored
 50     /nwcp swcp floor def      % the integer part is how many complete steps are drawn
```

```
/tln swcp nwcp sub def    % fractional part is used for the next partial pattern
/rwcorpat nwcp halfstep mul def    % parameter needed is half stroke width
/rw1 nwcp 1 add halfstep mul def    % and half width of larger partial stroke % Next we need the lengths for the partial pattern components
% The red pattern is a squiggle made from two arcs of 120 degrees
% We can increase the width on both sides of both arcs
% so there is 480 degrees to play with
/tln tln 480 mul def    % set the total length amount (in degrees for red)

% now break this up into the length of the four strokes
% no arc length can be more than 120 degrees
/l1r tln 120 2 copy gt {exch pop} {pop} ifelse def
/tln tln l1r sub def
/l2r tln 120 2 copy gt {exch pop} {pop} ifelse def
/tln tln l2r sub def
/l3r tln 120 2 copy gt {exch pop} {pop} ifelse def
/l4r tln l3r sub def %------------
% calculate the parameters for a blue pattern
% blue is draw before magenta or cyan so these can partially obscure it.
% to compensate we increase the blue width if there is cyan or magenta
% the heuristic used is bw = b / max(0.1, 1 - 0.89*(c+m))

% blue uses two 45 degree lines
% the step width is increased by sqrt(2) for 45 degress and halved for 2 lines
/bwcorpat 0.71 bcorpat mul 1 cwcorpat mwcorpat add 0.89 mul sub dup 0.1 lt {pop 0.1} if div def %new blue growth
% scale the total number of steps to fill cell by square root 2 for diagonal and
/swcp stepssq2 bwcorpat mul def    % the fraction of the cell to be colored
/nwcp swcp floor def    % the integer part is how many complete steps are drawn
/tln swcp nwcp sub def    % fractional part is used for the next partial pattern
/bwcorpat nwcp quarterstep mul def    % half width for each line is 1/4 total step
/bw1 nwcp 1 add quarterstep mul def    % half width for thicker partial pattern % tln was scaled to the proper length coordinates above
% since the lengths (l1b etc) are x and y offsets there is no sqrt(2) factor
% now we must separate it into for segments (each side of each line)
% we will grow each line from center out in two directions so we want
% a half length value.
% on the longer (inside) side of the stroke we add the width to the length
% to cover diagonal cut of line by cell boundary
/l1b tln 0.25 bwcorpat add 2 copy gt {exch pop} {pop} ifelse def
/tln tln l1b sub def
/l2b tln 0.25 bwcorpat sub 2 copy gt {exch pop} {pop} ifelse def
```

```
      /tln tln l2b sub def
      /l3b tln 0.25 bwcorpat add 2 copy gt {exch pop} {pop} ifelse def
      /l4b tln l3b sub def

5

%--------------
      % calculate parameters for red
      % the pattern for green is a cross
      % green is drawn before cyan or yellow so they can obscure it
      % to compensate we increase the green width if there is yellow or cyan
      % the heuristic used is gw = g / max(0.1, 1 - 2*(y + c))
      /gwcorpat gcorpat 1 ywcorpat cwcorpat 2 mul add 2 mul sub dup 0.1 lt {pop 0.1} if div dup mul def
      % green growth
      % scale the total number of steps to fill cell by
      /swcp steps gwcorpat mul def    % the fraction of the cell to be colored
      /nwcp swcp floor def       % the integer part is how many complete steps are drawn
      /tln swcp nwcp sub def    % fractional part is used for the next partial pattern
20    /gwcorpat nwcp halfstep mul def    % parameter needed is half stroke width
      /gw1 nwcp 1 add halfstep mul def   % and half width of larger partial stroke % for green we did not bother growing the two sides of a line independently
      % so we calculate two lengths l1g and l3g and use them for the other side too
25    % the partial pattern is grown in both direction from the cell center
      % so the maximum length is half the cell size
      /l1g tln 0.5 2 copy gt {exch pop} {pop} ifelse def
      /l2g l1g def
      /l3g tln l2g sub def
30    /l4g l3g def %-------------
35    % The pattern for black is a set of diamond shapes on 45 degree centers
      % This is done by constructing a diamond at the center and one at the corner
      % The corner case is made from 4 triangles
      % calculate offset for black triangles
      % in theory this should go as the square root of amount of black
40    % but it seems to look better if it doesn't drop off so fast
      % we use (k + sqrt(k))/4
      % black can be obscured by the other colors, but we ignore this for now
      /koffset kcorpat kcorpat sqrt add 4 div def 45    % since koffset only ranges to 0.5 we must multiply by 2 to scale the steps
      /swcp steps koffset mul 2 mul def
      /nwcp swcp floor def       % the integer part is how many complete steps are drawn
      /tln swcp nwcp sub def    % fractional part is used for the next partial pattern
      /koffset nwcp halfstep mul def    % half the step size is used for each side
50    /kw1 nwcp 1 add halfstep mul def  % find the next size for partial pattern
```

```
     % for the range of the partial length we use the offset for a side times
     % the 8 sides of the two diamonds
     /tln tln kw1 mul 8 mul def
5
     % we have 8 possible growth regions (the sides of the two diamonds)
     % we segment the total length into these 8 regions
     % where no region can be longer than the offset kw1
     /l1k tln kw1 2 copy gt {exch pop} {pop} ifelse def
10   /tln tln l1k sub def
     /l2k tln kw1 2 copy gt {exch pop} {pop} ifelse def
     /tln tln l2k sub def
     /l3k tln kw1 2 copy gt {exch pop} {pop} ifelse def
     /tln tln l3k sub def
15   /l4k tln kw1 2 copy gt {exch pop} {pop} ifelse def
     /tln tln l4k sub def
     /l5k tln kw1 2 copy gt {exch pop} {pop} ifelse def
     /tln tln l5k sub def
     /l6k tln kw1 2 copy gt {exch pop} {pop} ifelse def
20   /tln tln l6k sub def
     /l7k tln kw1 2 copy gt {exch pop} {pop} ifelse def
     /tln tln l7k sub def
     /l8k tln kw1 2 copy gt {exch pop} {pop} ifelse def 25
     % calculate offsets for diagonals
     /go1 0.5 gwcorpat 2 div sub def
     /go2 go1 gwcorpat add def
     /yo1 0.5 ywcorpat 2 div sub def
30   /yo2 yo1 ywcorpat add def
     /co1 0.5 cwcorpat 2 div sub def
     /co2 co1 cwcorpat add def % At this point the parameters needed for pattern construction have been found
35   % now start constructing the pattern %-------
     % white background
     1 setgray      % set color to white
40   0 0 1 1 rectfill  % and fill the cell %-------
     % pattern for black
45   % black triangles in the corners and a diamond in the center koffset 0 gt   % only do it if there actually is some black
     { 0 setgray    % set the color to black
     newpath        % start with a fresh path
50   % draw the triangles in the corners
```

```
    0 0 moveto 0 koffset lineto koffset 0 lineto fill
    0 1 moveto 0 1 koffset sub lineto koffset 1 lineto fill
    1 0 moveto 1 koffset sub 0 lineto 1 koffset lineto fill
    1 1 moveto 1 1 koffset sub lineto 1 koffset sub 1 lineto fill
5   % now draw the diamond in the center
    0.5 koffset add 0.5 moveto
    0.5 0.5 koffset add lineto
    0.5 koffset sub 0.5 lineto
    0.5 0.5 koffset sub lineto fill
10  } if % next draw the partial pattern for black
    % this is a set of up to 8 triangles that extend each of the sides of
    % the two diamonds
15  % for each we first check to see if the side needs extension
    % if the offset adjustment parameter is not zero then we construct the triangle
    newpath
    l1k 0 gt
    {
20  0 0 moveto 0 kw1 lineto l1k kw1 l1k sub lineto fill
    } if l2k 0 gt
    {
25  0 1 moveto 0 1 kw1 sub lineto l2k 1 kw1 sub l2k add lineto fill
    } if l3k 0 gt
    {
30  1 0 moveto 1 kw1 sub 0 lineto 1 kw1 sub l3k add l3k lineto fill
    } if l4k 0 gt
    {
35  1 1 moveto 1 1 kw1 sub lineto 1 l4k sub 1 kw1 sub l4k add lineto fill
    } if l5k 0 gt
    {
40  0.5 0.5 moveto 0.5 kw1 add 0.5 lineto l5k neg l5k neg rlineto fill
    } if l6k 0 gt
    {
45  0.5 0.5 moveto 0.5 0.5 kw1 add lineto l6k l6k neg rlineto fill
    } if l7k 0 gt
    {
50  0.5 0.5 moveto 0.5 kw1 sub 0.5 lineto l7k l7k rlineto fill
```

-31-

```
        } if l8k 0 gt
        {
5       0.5 0.5 moveto 0.5 0.5 kw1 sub lineto l8k neg l8k rlineto fill
        } if %----------
        % curve for red
        % red is a vertical squiggle
        gsave
        1 0 0 setrgbcodecolor   % set the current color to red % first check to see if there is any red to be drawn
        rwcorpat 0 gt
        {
        % here we draw the basic red pattern
        % it is the two sides of the two arcs
        newpath
20      0.5 1.1 moveto
        0.644 rwcorpat sub 0.75 .288 110 240 arc
        0.356 rwcorpat sub 0.25 .288 60 290 arcn
        0.356 rwcorpat add 0.25 .288 290 60 arc
        0.644 rwcorpat add 0.75 .288 240 110 arcn
25      fill % these next two fills give the connecting arcs for neighboring cells
        % this is so we get a clean join were the patterns meet across the cell edge
        1.5 1.1 moveto
30      1.644 rwcorpat sub 0.75 .288 110 240 arc
        1.5 0.5 lineto
        fill -0.5 0.5 moveto
35      -0.644 rwcorpat add 0.25 .288 290 60 arc
        -0.5 0 lineto
        fill } if
40

%red growth
        % these are the fills for the partial pattern
        % there are 4 cases since each side of each arc can grow
45      % we first check to see if there is some growth necessary before drawing
        % growth is done by extending the arc length for a thicker pattern
        % we include the adjoining cell piece
        llr 0 gt {
        0.5 0.5 moveto
50      0.644 rw1 sub 0.75 0.288 240 240 llr sub arcn
```

```
        0.644 rwcorpat add 0.75 0.288 240 l1r sub 240 arc
        fill
        } if 5     l1r 0 gt {
        1.5 0.5 moveto
        1.644 rw1 sub 0.75 0.288 240 240 l1r sub arcn
        1.644 rwcorpat add 0.75 0.288 240 l1r sub 240 arc
        fill
 10     } if l2r 0 gt {
        0.5 0.5 moveto
        0.356 rw1 sub 0.25 0.288 60 60 l2r sub arcn
 15     0.356 rwcorpat add 0.25 0.288 60 l2r sub 60 arc
        fill
        } if l3r 0 gt {
 20     0.5 0.5 moveto
        0.644 rw1 sub 0.75 0.288 240 240 l3r sub arcn
        0.644 rw1 add 0.75 0.288 240 l3r sub 240 arc
        fill
        } if
 25
        l4r 0 gt {
        0.5 0.5 moveto
        0.356 rw1 sub 0.25 0.288 60 60 l4r sub arcn
        0.356 rw1 add 0.25 0.288 60 l4r sub 60 arc
 30     fill
        } if l4r 0 gt {
 35     -0.5 0.5 moveto
        -0.644 rw1 sub 0.25 0.288 60 60 l4r sub arcn
        -0.644 rw1 add 0.25 0.288 60 l4r sub 60 arc
        fill
        } if
 40
        grestore %---------------
 45
        % fills for blue
        % blue is two diagonal lines gsave
        0 0 1 setrgbcodecolor       % set the color to blue
```

```
     newpath

% the lines are constructed as polygons
     % we only do it if there is some blue to draw
     bwcorpat 0 gt {
         % polygon vertices are extended outside the cell to be sure you can't see ends
         -0.25 bwcorpat sub 0.25 bwcorpat add moveto
         -0.25 bwcorpat add 0.25 bwcorpat sub lineto
         0.75 bwcorpat add 1.25 bwcorpat sub lineto
10       0.75 bwcorpat sub 1.25 bwcorpat add lineto
         fill % this is the second line
         0.25 bwcorpat sub -0.25 bwcorpat add moveto
15       0.25 bwcorpat add -0.25 bwcorpat sub lineto
         1.25 bwcorpat add 0.75 bwcorpat sub lineto
         1.25 bwcorpat sub 0.75 bwcorpat add lineto
         fill
     } if
20
     % blue growth
     % this draws the partial pattern where required
     % there are 4 possible fills for the two sides of the two lines
     % the extension grow in both directions from the line center
25   l1b 0 gt {
         0.75 l1b sub bwcorpat add 0.25 l1b sub bwcorpat sub moveto
         0.75 l1b add bwcorpat add 0.25 l1b add bwcorpat sub lineto
         0.75 l1b add bw1 sub  0.25 l1b add bw1 add lineto
         0.75 l1b sub bw1 sub  0.25 l1b sub bw1 add lineto
30       fill
     } if l4b 0 gt {
         0.75 l4b sub bw1 sub 0.25 l4b sub bw1 add moveto
35       0.75 l4b add bw1 sub 0.25 l4b add bw1 add lineto
         0.75 l4b add bw1  add  0.25 l4b add bw1  sub  lineto
         0.75 l4b sub bw1  add  0.25 l4b sub bw1  sub  lineto
         fill
     } if
40
     l2b 0 gt {
         0.25 l2b sub bwcorpat add 0.75 l2b sub bwcorpat sub moveto
         0.25 l2b add bwcorpat add 0.75 l2b add bwcorpat sub lineto
         0.25 l2b add bw1 sub  .75 l2b add bw1 add  lineto
45       0.25 l2b sub bw1 sub  .75 l2b sub bw1 add  lineto
         fill
     } if l3b 0 gt {
         0.25 l3b sub bw1 sub 0.75 l3b sub bw1 add moveto
```

```
    0.25 l3b add bw1 sub 0.75 l3b add bw1 add lineto
    0.25 l3b add bw1 add 0.75 l3b add bw1 sub lineto
    0.25 l3b sub bw1 add 0.75 l3b sub bw1 sub lineto
    fill
} if grestore % fills for green
% The pattern for green is a cross
gsave
0 1 0 setrgbcodecolor    % the color is set to green
newpath % the lines are actually constructed as polygons
% this is the horizontal line
gwcorpat 0 gt {
    0 gwcorpat sub 0.5 gwcorpat add moveto
    1 gwcorpat add 0.5 gwcorpat add lineto
    1 gwcorpat add 0.5 gwcorpat sub lineto
    0 gwcorpat sub 0.5 gwcorpat sub lineto
    fill
} if % this is the vertical line
gwcorpat 0 gt {
    0.5 gwcorpat sub 0 gwcorpat sub moveto
    0.5 gwcorpat sub 1 gwcorpat add lineto
    0.5 gwcorpat add 1 gwcorpat add lineto
    0.5 gwcorpat add 0 gwcorpat sub lineto
    fill
} if % now we do the partial pattern for green where necessary
% the partial is a thicker line segment that grows out in both directions
% from the center
% this is one side of the horizontal
11g 0 gt {
    0.5 11g sub 0.5 gwcorpat sub moveto
    0.5 11g add 0.5 gwcorpat sub lineto
    0.5 11g add 0.5 gw1 add lineto
    0.5 11g sub 0.5 gw1 add lineto
    fill
} if
```

```
    % one side of the vertical
    12g 0 gt {
        0.5 gwcorpat sub 0.5 12g sub moveto
        0.5 gwcorpat sub 0.5 12g add lineto
5       0.5 gw1 add  0.5 12g add lineto
        0.5 gw1 add  0.5 12g sub lineto
        fill
    } if 10  % second horizontal side
    13g 0 gt {
        0.5 13g sub 0.5 gw1 sub moveto
        0.5 13g add 0.5 gw1 sub lineto
        0.5 13g add 0.5 gw1 add lineto
15      0.5 13g sub 0.5 gw1 add lineto
        fill
    } if %second vertical side
20  14g 0 gt {
        0.5 gw1 sub 0.5 14g sub moveto
        0.5 gw1 sub 0.5 14g add lineto
        0.5 gw1 add 0.5 14g add lineto
        0.5 gw1 add 0.5 14g sub lineto
25      fill
    } if grestore 30
    %-------
    % fills for magenta
    % magenta is two diagonal lines
    gsave
    1 0 1 setrgbcodecolor    % set color to magenta newpath % the lines are constructed as polygons
    % we only do it if there is some magenta to draw
    mwcorpat 0 gt {
        % polygon vertices are extended outside the cell to be sure you can't see ends
        0.75 mwcorpat sub -0.25 mwcorpat sub moveto
        0.75 mwcorpat add -0.25 mwcorpat add lineto
45      -0.25 mwcorpat add 0.75 mwcorpat add lineto
        -0.25 mwcorpat sub 0.75 mwcorpat sub lineto
        fill 50      1.25 mwcorpat sub 0.25 mwcorpat sub moveto
```

```
            1.25 mwcorpat add 0.25 mwcorpat add lineto
            0.25 mwcorpat add 1.25 mwcorpat add lineto
            0.25 mwcorpat sub 1.25 mwcorpat sub lineto
            fill
   5    }if % mag growth
        % this draws the partial pattern where required
        % there are 4 possible fills for the two sides of the two lines
   10   % the extension grow in both directions from the line center
        l1m 0 gt{
            0.75 l1m sub mwcorpat add 0.75 l1m add mwcorpat add moveto
            0.75 l1m add mwcorpat add 0.75 l1m sub mwcorpat add lineto
            0.75 l1m add mw1 sub  0.75 l1m sub mw1 sub lineto
   15       0.75 l1m sub mw1 sub  0.75 l1m add mw1 sub lineto
            fill
        }if l4m 0 gt {
   20       0.75 l4m sub mw1 sub 0.75 l4m add mw1 sub moveto
            0.75 l4m add mw1 sub 0.75 l4m sub mw1 sub lineto
            0.75 l4m add mw1 add  0.75 l4m sub mw1 add  lineto
            0.75 l4m sub mw1 add  0.75 l4m add mw1 add  lineto
            fill
   25   } if l2m 0 gt {
            0.25 l2m sub mwcorpat add 0.25 l2m add mwcorpat add moveto
            0.25 l2m add mwcorpat add 0.25 l2m sub mwcorpat add lineto
   30       0.25 l2m add mw1 sub  .25 l2m sub mw1 sub  lineto
            0.25 l2m sub mw1 sub  .25 l2m add mw1 sub  lineto
            fill
        } if 35   l3m 0 gt {
            0.25 l3m sub mw1 sub 0.25 l3m add mw1 sub moveto
            0.25 l3m add mw1 sub 0.25 l3m sub mw1 sub lineto
            0.25 l3m add mw1 add 0.25 l3m sub mw1 add lineto
            0.25 l3m sub mw1 add 0.25 l3m add mw1 add lineto
   40       fill
        } if grestore 45
        %--------
        % draw the yellow pattern
        % yellow is a circle
     gsave
```

```
    1 1 0 setrgbcodecolor    % set the color to yellow

% check to see if there is yellow to draw
    ywcorpat 0 gt
    {
    ywcorpat setlinewidth    % yellow is drawn as a stroke
    0.5 0.5 .25 0 360 arc stroke
    } if
    % growth in yellow is done as a partial circle
    l1y 0 gt
    {
    yw1 setlinewidth          % use the thicker line width
    0.5 0.5 0.25 0 l1y arc stroke   % and draw the arc
    } if grestore %-------
    % curve for cyan
    % cyan is a horizontal squiggle
    gsave
    0 1 1 setrgbcodecolor    % set the color to cyan
    % first check to see if there is any cyan to be drawn
    cwcorpat 0 gt
    {

30  newpath
    % here we draw the basic cyan pattern
    % it is the two sides of the two arcs
    1.1 0.5 moveto 35  0.75 0.644 cwcorpat sub .288 330 210 arcn
    0.25 0.356 cwcorpat sub .288 30 150 arc
    0.25 0.356 cwcorpat add .288 150 30 arcn
    0.75 0.644 cwcorpat add .288 210 330 arc  fill 40  % these next two fills give the connecting arcs for neighboring cells
    % this is so we get a clean join were the patterns meet across the cell edge
    .75 1.5 moveto
    0.75 1.644 cwcorpat sub .288 330 200 arcn
    0.5 1.5 lineto
45  fill 0.5 -0.5 moveto
    0.25 -0.644 cwcorpat add .288 20 150 arc
    -0.5 0 lineto
50  fill
```

```
} if

%cyan growth
% these are the fills for the partial pattern
% there are 4 cases since each side of each arc can grow
% we first check to see if there is some growth necessary before drawing
% growth is done by extending the arc length for a thicker pattern
% we include the adjoining cell piece
11c 0 gt {
  0.5 0.5 moveto
  0.75 0.644 cw1 sub 0.288 210 210 11c add arc
  0.75 0.644 cwcorpat add 0.288 210 11c add 210 arcn
  fill
} if 11c 0 gt {
  0.5 1.5 moveto
  0.75 1.644 cw1 sub 0.288 210 210 11c add arc
  0.75 1.644 cwcorpat add 0.288 210 11c add 210 arcn
  fill
} if 12c 0 gt {
  0.5 0.5 moveto
  0.25 0.356 cw1 sub 0.288 30 30 12c add arc
  0.25 0.356 cwcorpat add 0.288 30 12c add 30 arcn
  fill
} if 13c 0 gt {
  0.5 0.5 moveto
  0.75 0.644 cw1 sub 0.288 210 210 13c add arc
  0.75 0.644 cw1 add 0.288 210 13c add 210 arcn
  fill
} if 14c 0 gt {
  0.5 0.5 moveto
  0.25 0.356 cw1 sub 0.288 30 30 14c add arc
  0.25 0.356 cw1 add 0.288 30 14c add 30 arcn
  fill
} if 14c 0 gt {
  0.5 -0.5 moveto
  0.25 -0.644 cw1 sub 0.288 30 30 14c add arc
  0.25 -0.644 cw1 add 0.288 30 14c add 30 arcn
  fill
} if
```

```
      grestore

%-------------------------------
 5    % As the colors become more saturated, the patterns grow to they fill the cell
      % If this happens we no longer have a distinguishable pattern
      % To prevent this and to give a clean pattern shape we overlay a white curve
      % along the boundary where the pattern components meet
      % This is done for r, g, b, c, m
      % if there is red we draw a white vertical squiggle along the cell boundary
        1 setgray
        0.1 setlinewidth
        newpath
      rwcorpat 0 gt
      {
      1.144 0.75 .288 110 250 arc stroke
      -0.144 0.25 .288 290 70 arc stroke
      }
      {
      1.144 0.75 .288 240 240 l1r l2r add l3r add l4r add 4 div sub arcn stroke
      -0.144 0.25 .288 240 l1r l2r add l3r add l4r add 4 div sub 240 arcn stroke
      }
      ifelse
      % if there is enough blue we place a diagonal white line down the cell center
      %bwcorpat thickenough gt
      %{
        gsave
30      1 setgray
        newpath
      0.1 setlinewidth
      bwcorpat 0 gt
      {
      0 0 moveto 1 1 lineto stroke
      -0.2 0.8 moveto 0.2 1.2 lineto stroke
      0.8 -0.2 moveto 1.2 0.2 lineto stroke
      }
      {
      0 0 moveto l1b l2b add l3b add l4b add dup lineto stroke
      } ifelse
        grestore
      %} if
      % for green we draw a white cross along the cell boundary
      gsave
        1 setgray
        newpath
      0.05 setlinewidth
```

```
     gwcorpat 0 gt
     { 0 0 moveto 1.0 0 lineto 1.0 0.05 lineto 0.0 0.05 lineto fill
     0 0 moveto 0 1 lineto  0.05 1 lineto 0.05 0 lineto fill
     }
     {
     0 0 moveto l1g l3g add dup 0 lineto dup 0.05 lineto  0 0.05 lineto fill
     0 0 moveto dup 0 exch lineto  0.05 exch lineto 0.05 0 lineto fill
     } ifelse
     grestore

% if there is enough magenta we place a diagonal white line down the cell center
     %mwcorpat thickenough gt
     %{
15   1 setgray
     newpath 0.1 setlinewidth
     mwcorpat 0 gt
     {
     0 1 moveto 1 0 lineto stroke
     -0.2 0.2 moveto 0.2 -0.2 lineto stroke
     0.8 1.2 moveto 1.2 0.8 lineto stroke
     }
     {
     0 1 moveto l1m l2m add l3m add l4m add dup 1 exch sub  lineto stroke
     } ifelse
     %  0.75 mw1 0.035 add dup 0.25 gt { pop 0.25 } if add
     % -0.25 mw1 0.035 add dup 0.25 gt { pop 0.25 } if add moveto
     %  0.75 mw1 dup 0.215 gt { pop 0.215 } if add
     % -0.25 mw1 dup 0.215 gt { pop 0.215 } if add lineto
     % -0.25 mw1 dup 0.215 gt { pop 0.215 } if add
35   %  0.75 mw1 dup 0.215 gt { pop 0.215 } if add lineto
     % -0.25 mw1 0.035 add dup 0.25 gt { pop 0.25 } if add
     %  0.75 mw1 0.035 add dup 0.25 gt { pop 0.25 } if add lineto
     % fill 40   %} if % draw horizontal white squiggle along cell boundary for near solid cyan
     1 setgray
     0.1 setlinewidth
     newpath
     cwcorpat 0 gt
     {
     0.75 1.144 .288 330 200 arcn stroke
     0.25 -0.144 .288 20 160 arc stroke
```

```
        }
        {
        0.75 1.144 .288 200 200 I1c I2c add I3c add I4c add 4 div add arc stroke
        0.25 -0.144 .288 20 20 I1c I2c add I3c add I4c add 4 div add arc stroke
        } ifelse % We handle yellow somewhat differently
        % we dont use a white line because yellow will probably copy as white
        % and it wouldn't be seen.
        % we could use black, but not a join line of pattern because it doesn't join
        % we could put black down the center of the circle, but this is too dark
        % we could put dashes to lighten it up
        % and we can use red and green dashes instead of black to further lighten it
        % this is what we do.
        % we want these dashes to always be visible becaues they are all that will copy
        % In order to distinguish strong yellow from weak we change the dash length ywcorpat 0.05 gt    % if there is some yellow (so we don't hide it)
        {
        1 0 0 setrgbcodecolor   % set the color to red
        [0.2 ycorpat mul dup 0.8 exch sub] 0 setdash   % dash length by yellow strength
        newpath
        0.5 0.5 .25 0 360 arc stroke     % draw a red dashed circle
        0 1 0 setrgbcodecolor            % set the color to green
        [0.2 ycorpat mul dup 0.8 exch sub] 0.4 setdash   % green dashes between reds
        newpath
        0.5 0.5 .25 0 360 arc stroke    % draw green dashed circle
      } if grestore
        end
        } bind def
  35

/setnewpattern
        % This operator constructs and installs a pattern for a color
  40    % It expects the RGB color coordinates on the stack
        {
        gsave     % save the current transformation
        matrix defaultmatrix setmatrix    % install the default transformation
                                          % so we will know the pattern size
  45    patterncellsize patterncellsize scale   % scale to the desired size % A PostScript pattern is actually defined by a dictionary
        % that includes among other things the procedure for drawing the pattern shape
        % Here is our pattern dictionary
  50    <<
```

```
        4 1 roll      % we roll the color coordinates into the dictionary
        /patr 4 1 roll   % and assign them to variables
        /patg 3 1 roll
        /patb exch
  5     /PaintType 1    % It is a colored pattern
        /PatternType 1 /TilingType 1    % It uses constant spacing
        /BBox [0 0 1 1]                 % Its a unit cell in the pattern coordinates
        /XStep 1 /YStep 1
        /PaintProc {    % and to draw the pattern we call buildpattern with r, g, b
 10     begin
        patr patg patb buildpattern
        end
        }
        >>
 15     matrix       % Identity matrix, no further transformation
        makepattern     % Here we construct the pattern
        grestore
        setpattern   % Now we install the pattern as the current color
        } bind def
 20

%----------------------------------

25     /rectfill
        % redefinition of the operator to fill with a pattern
        {
        % save current color information
        /colorsaver [ currentcolor currentcolorspace ] def
 30     currentrgbdecodecolor setnewpattern    % set the color to a pattern
        rectfill                               % do the fill
        colorsaver aload pop setcolorspace setcolor    % restore the color
        } bind def

35

/fill
        % redefinition of the operator to fill with a pattern
        {
 40     % save current color information
        /colorsaver [ currentcolor currentcolorspace ] def
        currentrgbdecodecolor setnewpattern    % set the color to a pattern
        fill                                   % do the fill
        colorsaver aload pop setcolorspace setcolor    % restore the color
 45     } bind def /eofill
        % redefinition of the operator to fill with a pattern
 50     {
```

```
        % save current color information
        /colorsaver [ currentcolor currentcolorspace ] def
        currentrgbdecodecolor setnewpattern        % set the color to a pattern
        cofill                                      % do the fill
5       colorsaver aload pop setcolorspace setcolor  % restore the color
        } bind def /ufill
10      % redefinition of the operator to fill with a pattern
        {
        % save current color information
        /colorsaver [ currentcolor currentcolorspace ] def
        currentrgbdecodecolor setnewpattern        % set the color to a pattern
15      ufill                                       % do the fill
        colorsaver aload pop setcolorspace setcolor  % restore the color
        } bind def 20
        /ueofill
        % redefinition of the operator to fill with a pattern
        {
        % save current color information
25      /colorsaver [ currentcolor currentcolorspace ] def
        currentrgbdecodecolor setnewpattern        % set the color to a pattern
        ueofill                                     % do the fill
        colorsaver aload pop setcolorspace setcolor  % restore the color
        } bind def
30
```

Section II

```
        %!

        %-----------------------------------------
        % BLACK-AND-WHITE FRIENDLY MONOCHROME HEADER
        % Created by Steve Harrington and Jean Taber
        % Last modified Jan 12, 1996

        % This version modified Sept. 16, 1996
        Copyright Xerox Corporation, 1996. All rights reserved.

%-----------------------------------------
        % Black-and-White Friendly Monochrome provides rendering of a document so as to
        % preserve information, differentiated by color, should the document be printed on a
        % black-and-white device. It does this by redefining the PostScript rendering operators.
        % For solid areas the idea is to represent colors by printing a texture pattern. This
        % is done by redefining the operators "rectfill", "fill", "eofill", "ufill" and ueofill.
```

% When one of these operators is called it looks up the current color and generates a
% texture pattern. This pattern is then installed as the current color and the fill
% proceeds. Note that objects constructed from a large number of fills can result in
% a large number of pattern constructions which can slow things down.

%--------UTILITIES---------

%------
% define some useful parameters
%------
/patterncellsize 3 def    % controls the coarsness of the pattern
%------

/currentrgbdecodecolor
%------
% This procedure is an alternative to currentrgbcolor that does reasonable things
% when the device independent color spaces are used.
% It's pretty dumb in that it just treats CIABasedABC as if it were RGB
% with no conversions.
% And for CIEBasedA it just duplicates the parameter twice for the RGB values.
% PostScript should do the right thing for the device dependent spaces.
% There is a setrgbcodecolor operator to set values extracted this way
%------
{ currentcolorspace    % determine what color space we must deal with
  0 get                % we get an array with name and parameter, keep the name dup /CIEBasedABC eq   % dup the name so we dont lose it and see if its ABC
  {           % assume rgb in disguise for now
    pop currentcolor}   % if so pop the name and get the ABC values
  { dup /CIEBasedA eq    % if not see if its CIEBased A
    {           % assume gray linear for now
      pop currentcolor  % pop the name and get the A value
      dup dup )         % dup twice to get values for gray
    {
        pop currentrgbcolor }
    ifelse
  } ifelse
} bind def /setrgbcodecolor
%------
% This procedure is an alternative to setrgbcolor that does reasonable things
% when the device independent color spaces are used.
% It's pretty dumb in that it just treats CIABasedABC as if it were RGB
% with no conversions.
% There is a setrgbcodecolor operator to set values extracted this way
%------
{ currentcolorspace    % determine what color space we must deal with

```
        0 get            % we get an array with name and parameter, keep the name
        /CIEBasedABC eq  % at this time we only support ABC or RGB
        {setcolor}
        {setrghcolor}
 5      ifelse
        } bind def 10  /buildpattern
    %------
    % takes rgb and constructs a pattern in unit square
    % the pattern can be used for filling polygons
    % the operator expects r,g,b values on the stack
15  %------
    {
        <<              % set up dictionary of local variables
        4 1 roll        % roll the r, g, b values past dictionary marker
        /rcorpat 4 1 roll  % position them as value to variables
20      /gcorpat 3 1 roll
        /bcorpat exch
        /ccorpat 0         % we will calculate and save values for c, m, y, k, w
        /mcorpat 0
        /ycorpat 0
        /kcorpat 0
        /wcorpat 0
        /rwcorpat 0        % pattern width parametes fro the various colors
        /gwcorpat 0
        /bwcorpat 0
        /cwcorpat 0
        /mwcorpat 0
        /ywcorpat 0        % thickness of circle used for complete yellow pattern
        /koffset 0
        /go1 0
35      /go2 0
        /yo1 0
        /yo2 0
        /co1 0
        /co2 0
40      /thickenough 0.05
        /twcorpat 0.02
        /steps 16
        /halfstep 0.5 16 div
        /quarterstep 0.25 16 div
45      /stepssq2 16 0.71 div
        /swcp 0  % used to calculate the fraction of steps to be imaged in a pattern
        /nwcp 0  % used for integer number of steps to be imaged
        /tln 0   % used to calculate the fraction of step and corresponding lengths
        /bw1 0   % thickness parameter for blue partial pattern
50      /l1b 0   % lengths for the blue partial pattern
```

```
        /l2b 0
        /l3b 0
        /l4b 0
        /tln 0
        /mw1 0    % thickness parameter for magenta partial pattern
        /l1m 0    % lengths for magenta partial pattern segments
        /l2m 0
        /l3m 0
        /l4m 0
10      /gw1 0    % thickness parameter for green partial pattern
        /l1g 0    % lengths for the green partial pattern
        /l2g 0
        /l3g 0
        /l4g 0
15      /rw1 0    % thickness parameter for red partial pattern
        /l1r 0    % arclengths for the red partial pattern
        /l2r 0
        /l3r 0
        /l4r 0
        /cw1 0    % thickness parameter for cyan partial pattern
        /l1c 0    % arclengths for the cyan partial pattern components
        /l2c 0
        /l3c 0
        /l4c 0
        /yw1 0    % thickness of partial yellow pattern
        /l1y 0    % length of partial arc for partial yellow pattern
        /kw1 0    % size parameter for black partial pattern
        /l1k 0    % side length adjustments for the black partial pattern
        /l2k 0
        /l3k 0
        /l4k 0
        /l5k 0
        /l6k 0
        /l7k 0
35      /l8k 0

>>
        begin
        gsave
40      twcorpat setlinewidth
        0 setlinecap
        2 setlinejoin 45      % set wcorpat to min (the amount of white in the color),
        % set kcorpat to 1 - max (the amount of black in the color)
        rcorpat gcorpat gt { /kcorpat rcorpat def /wcorpat gcorpat def } {/kcorpat gcorpat def /wcorpat rcorpat
        def } ifelse
        bcorpat kcorpat gt { /kcorpat bcorpat def } if
50      bcorpat wcorpat lt { /wcorpat bcorpat def } if
```

```
    /kcorpat 1 kcorpat sub def

% remove white from rgb
    /rcorpat rcorpat wcorpat sub def
5   /gcorpat gcorpat wcorpat sub def
    /bcorpat bcorpat wcorpat sub def % calculate secondary color
    gcorpat bcorpat gt { /ccorpat bcorpat def } { /ccorpat gcorpat def } ifelse
10  rcorpat bcorpat gt { /mcorpat bcorpat def } { /mcorpat rcorpat def } ifelse
    rcorpat gcorpat gt { /ycorpat gcorpat def } { /ycorpat rcorpat def } ifelse % remove secondary color from primary
    /rcorpat rcorpat mcorpat ycorpat add sub def
    /gcorpat gcorpat ycorpat ccorpat add sub def
    /bcorpat bcorpat ccorpat mcorpat add sub def % set to print black
    /rcorpat rcorpat 0.65 mul def
    /gcorpat gcorpat 0.4 mul def
    /bcorpat bcorpat 0.95 mul def
    /ccorpat ccorpat 0.4 mul def
    /mcorpat mcorpat 0.7 mul def
    /ycorpat ycorpat 0.25 mul def

% in the Adobe PostScript implementation patterns don't grow smoothly
    % for example if the pattern is a horizontal line if the width of the line
    % is continuously increased, the width of the rendered pattern will increase
30  % in discrete steps.
    % this can cause jumps in intensity of the pattern causing contours in sweeps
    % To work around this we can make the pattern with a full horizontal line at
    % one width and a partial line on top of it at a thicker width.
    % instead of thickening the line we increase the length of the thicker piece.
35  % we thicken until it fills the length of the cell then start a new thicker line
    % This idea is done for all the patterns, so they need two width and also
    % lengths for the thicker partial patterns.
    % Some pattern are made of several lines so we need lengths for all pieces.
    % Also a line can be thickened on just one side, and then on the other side.
40
    %---------------
    % calculate the cyan pattern parameters
    % begin by calculating a width to use for the cyan pattern
    % c, m, and y are laid down last so no compensation is needed for other colors
45
    /cwcorpat ccorpat def % scale the total number of steps to fill cell by
    /swcp steps cwcorpat mul def    % the fraction of the cell to be colored
50  /nwcp swcp floor def    % the integer part is how many complete steps are drawn
```

```
        /tln swcp nwcp sub def    % fractional part is used for the next partial pattern
        /cwcorpat nwcp halfstep mul def    % parameter needed is half stroke width
        /cw1 nwcp 1 add halfstep mul def    % and half width of larger partial stroke 5      % Next we need the lengths for the partial pattern components
        % The cyan pattern is a squiggle made from two arcs of 120 degrees
        % We can increase the width on both sides of both arcs
        % so there is 480 degrees to play with
        /tln tln 480 mul def    % set the total length amount (in degrees for cyan)
10
        % now break this up into the length of the four strokes
        % no arc length can be more than 120 degrees
        /l1c tln 120 2 copy gt {exch pop} {pop} ifelse def
        /tln tln l1c sub def
15      /l2c tln 120 2 copy gt {exch pop} {pop} ifelse def
        /tln tln l2c sub def
        /l3c tln 120 2 copy gt {exch pop} {pop} ifelse def
        /l4c tln l3c sub def 20
        %----------
        % calculate the yellow pattern parameters
        % begin by calculating a width to use for the yellow pattern
        % yellow is a circle and as its thickness increases it exceeds the square cell
25      % we use a quadratic function to increase thickness faster as cell fills
        % yw = 0.3y + 0.45y*y
        /ywcorpat 0.3 ycorpat mul 0.45 ycorpat dup mul mul add def % scale the total number of steps to fill cell by
30      /swcp steps ywcorpat mul def    % the fraction of the cell to be colored
        /nwcp swcp floor def    % the integer part is how many complete steps are drawn
        /tln swcp nwcp sub def    % fractional part is used for the next partial pattern
        /ywcorpat nwcp steps div def    % stroke width of complete yellow circle
        /yw1 nwcp 1 add steps div def    % storke width of larger partial arc
35
        % length of the partial arc is its fraction of a full circle (360 degrees)
        /l1y tln 360 mul def 40
        %------------------
        % calculate parameters for the magenta pattern
        % magenta uses two 45 degree lines
        % the step width is increased by sqrt(2) for 45 degress and halved for 2 lines
45      /mwcorpat 0.71 mcorpat mul def %new magenta growth
        % scale the total number of steps to fill cell by square root 2 for diagonal and
        /swcp stepssq2 mwcorpat mul def    % the fraction of the cell to be colored
50      /nwcp swcp floor def    % the integer part is how many complete steps are drawn
```

```
        /tln swcp nwcp sub def     % fractional part is used for the next partial pattern
        /mwcorpat nwcp quarterstep mul def  % half width for each line is 1/4 total step
        /mw1 nwcp 1 add quarterstep mul def  % half width for thicker partial pattern 5      % tln was scaled to the proper length coordinates above
        % now we must separate it into for segments (each side of each line)
        % we will grow each line from center out in two directions so we want
        % a half length value.
        % since the lengths (l1m etc) are x and y offsets there is no sqrt(2) factor
10      % on the longer (inside) side of the stroke we add the width to the length
        % to cover diagonal cut of line by cell boundary
        /l1m tln 0.25 mwcorpat add 2 copy gt {exch pop} {pop} ifelse def
        /tln tln l1m sub def
        % for the shorter (outside) side of the stroke we can subtract the width
15      /l2m tln 0.25 mwcorpat sub 2 copy gt {exch pop} {pop} ifelse def
        /tln tln l2m sub def
        /l3m tln 0.25 mwcorpat add 2 copy gt {exch pop} {pop} ifelse def
        /l4m tln l3m sub def 20
        %--------------
        % calculate parameters for red
        % the red pattern is a squiggle made from two arcs
25      % red is draw before magenta or yellow so these can partially obscure it.
        % to compensate we increase the red width if there is yellow or magenta
        % the heuristic used is rw = r / max(0.1, 1 - 2*y - m)
        /rwcorpat rcorpat 1 ywcorpat 2 mul mwcorpat add sub dup 0.1 lt {pop 0.1} if div def 30      % scale the total number of steps to fill cell by
        /swcp steps rwcorpat mul def     % the fraction of the cell to be colored
        /nwcp swcp floor def       % the integer part is how many complete steps are drawn
        /tln swcp nwcp sub def    % fractional part is used for the next partial pattern
        /rwcorpat nwcp halfstep mul def    % parameter needed is half stroke width
35      /rw1 nwcp 1 add halfstep mul def   % and half width of larger partial stroke % Next we need the lengths for the partial pattern components
        % The red pattern is a squiggle made from two arcs of 120 degrees
40      % We can increase the width on both sides of both arcs
        % so there is 480 degrees to play with
        /tln tln 480 mul def    % set the total length amount (in degrees for red)

% now break this up into the length of the four strokes
45      % no arc length can be more than 120 degrees
        /l1r tln 120 2 copy gt {exch pop} {pop} ifelse def
        /tln tln l1r sub def
        /l2r tln 120 2 copy gt {exch pop} {pop} ifelse def
        /tln tln l2r sub def
50      /l3r tln 120 2 copy gt {exch pop} {pop} ifelse def
```

```
      /l4r tln l3r sub def

%-------------
 5    % calculate the parameters for a blue pattern
      % blue is draw before magenta or cyan so these can partially obscure it.
      % to compensate we increase the blue width if there is cyan or magenta
      % the heuristic used is bw = b / max(0.1, 1 - 0.89*(c+m))

10    % blue uses two 45 degree lines
      % the step width is increased by sqrt(2) for 45 degress and halved for 2 lines
      /bwcorpat 0.71 bcorpat mul 1 cwcorpat mwcorpat add 0.89 mul sub dup 0.1 lt {pop 0.1} if div def 15    %new blue growth
      % scale the total number of steps to fill cell by square root 2 for diagonal and
      /swcp stepssq2 bwcorpat mul def   % the fraction of the cell to be colored
      /nwcp swcp floor def      % the integer part is how many complete steps are drawn
      /tln swcp nwcp sub def    % fractional part is used for the next partial pattern
20    /bwcorpat nwcp quarterstep mul def % half width for each line is 1/4 total step
      /bw1 nwcp 1 add quarterstep mul def  % half width for thicker partial pattern % tln was scaled to the proper length coordinates above
      % since the lengths (l1b etc) are x and y offsets there is no sqrt(2) factor
25    % now we must separate it into for segments (each side of each line)
      % we will grow each line from center out in two directions so we want
      % a half length value.
      % on the longer (inside) side of the stroke we add the width to the length
      % to cover diagonal cut of line by cell boundary
30    /l1b tln 0.25 bwcorpat add 2 copy gt {exch pop} {pop} ifelse def
      /tln tln l1b sub def
      /l2b tln 0.25 bwcorpat sub 2 copy gt {exch pop} {pop} ifelse def
      /tln tln l2b sub def
      /l3b tln 0.25 bwcorpat add 2 copy gt {exch pop} {pop} ifelse def
35    /l4b tln l3b sub def %-------------
40    % calculate parameters for red
      % the pattern for green is a cross
      % green is drawn before cyan or yellow so they can obscure it
      % to compensate we increase the green width if there is yellow or cyan
      % the heuristic used is gw = g / max(0.1, 1 - 2*(y + c))
      /gwcorpat gcorpat 1 ywcorpat cwcorpat add 2 mul sub dup 0.1 lt {pop 0.1} if div dup mul def % green growth
      % scale the total number of steps to fill cell by
      /swcp steps gwcorpat mul def    % the fraction of the cell to be colored
      /nwcp swcp floor def      % the integer part is how many complete steps are drawn
```

-51-

```
        /tln swcp nwcp sub def      % fractional part is used for the next partial pattern
        /gwcorpat nwcp halfstep mul def    % parameter needed is half stroke width
        /gw1 nwcp 1 add halfstep mul def   % and half width of larger partial stroke 5      % for green we did not bother growing the two sides of a line independently
        % so we calculate two lengths l1g and l3g and use them for the other side too
        % the partial pattern is grown in both direction from the cell center
        % so the maximum length is half the cell size
        /l1g tln 0.5 2 copy gt {exch pop} {pop} ifelse def
10      /l2g l1g def
        /l3g tln l2g sub def
        /l4g l3g def 15
        %------------
        % The pattern for black is a set of diamond shapes on 45 degree centers
        % This is done by constructing a diamond at the center and one at the corner
        % The corner case is made from 4 triangles
20      % calculate offset for black triangles
        % in theory this should go as the square root of amount of black
        % but it seems to look better if it doesn't drop off so fast
        % we use (k + sqrt(k))/4
        % black can be obscured by the other colors, but we ignore this for now
25      /koffset kcorpat kcorpat sqrt add 4 div def % since koffset only ranges to 0.5 we must multiply by 2 to scale the steps
        /swcp steps koffset mul 2 mul def
        /nwcp swcp floor def       % the integer part is how many complete steps are drawn
30      /tln swcp nwcp sub def     % fractional part is used for the next partial pattern
        /koffset nwcp halfstep mul def    % half the step size is used for each side
        /kw1 nwcp 1 add halfstep mul def  % find the next size for partial pattern % for the range of the partial length we use the offset for a side times
35      % the 8 sides of the two diamonds
        /tln tln kw1 mul 8 mul def % we have 8 possible growth regions (the sides of the two diamonds)
        % we segment the total length into these 8 regions
40      % where no region can be longer than the offset kw1
        /l1k tln kw1 2 copy gt {exch pop} {pop} ifelse def
        /tln tln l1k sub def
        /l2k tln kw1 2 copy gt {exch pop} {pop} ifelse def
        /tln tln l2k sub def
45      /l3k tln kw1 2 copy gt {exch pop} {pop} ifelse def
        /tln tln l3k sub def
        /l4k tln kw1 2 copy gt {exch pop} {pop} ifelse def
        /tln tln l4k sub def
        /l5k tln kw1 2 copy gt {exch pop} {pop} ifelse def
50      /tln tln l5k sub def
```

```
    /l6k tln kw1 2 copy gt {exch pop} {pop} ifelse def
    /tln tln l6k sub def
    /l7k tln kw1 2 copy gt {exch pop} {pop} ifelse def
    /tln tln l7k sub def
5   /l8k tln kw1 2 copy gt {exch pop} {pop} ifelse def % calculate offsets for diagonals
    /go1 0.5 gwcorpat 2 div sub def
10  /go2 go1 gwcorpat add def
    /yo1 0.5 ywcorpat 2 div sub def
    /yo2 yo1 ywcorpat add def
    /co1 0.5 cwcorpat 2 div sub def
    /co2 co1 cwcorpat add def
15
    % At this point the parameters needed for pattern construction have been found
    % now start constructing the pattern %-------
20  % white background
    1 setgray    % set color to white
    0 0 1 1 rectfill  % and fill the cell 25  %-------
    % pattern for black
    % black triangles in the corners and a diamond in the center koffset 0 gt   % only do it if there actually is some black
30  { 0 setgray    % set the color to black
    newpath        % start with a fresh path
    % draw the triangles in the corners
    0 0 moveto 0 koffset lineto koffset 0 lineto fill
    0 1 moveto 0 1 koffset sub lineto koffset 1 lineto fill
35  1 0 moveto 1 koffset sub 0 lineto 1 koffset lineto fill
    1 1 moveto 1 1 koffset sub lineto 1 koffset sub 1 lineto fill
    % now draw the diamond in the center
    0.5 koffset add 0.5 moveto
    0.5 0.5 koffset add lineto
40  0.5 koffset sub 0.5 lineto
    0.5 0.5 koffset sub lineto fill
    } if % next draw the partial pattern for black
45  % this is a set of up to 8 triangles that extend each of the sides of
    % the two diamonds
    % for each we first check to see if the side needs extension
    % if the offset adjustment parameter is not zero then we construct the triangle
    newpath
50  l1k 0 gt
```

```
        {
        0 0 moveto 0 kw1 lineto l1k kw1 l1k sub lineto fill
        } if 5      l2k 0 gt
        {
        0 1 moveto 0 1 kw1 sub lineto l2k 1 kw1 sub l2k add lineto fill
        } if 10      l3k 0 gt
        {
        1 0 moveto 1 kw1 sub 0 lineto 1 kw1 sub l3k add l3k lineto fill
        } if 15      l4k 0 gt
        {
        1 1 moveto 1 1 kw1 sub lineto 1 l4k sub 1 kw1 sub l4k add lineto fill
        } if 20      l5k 0 gt
        {
        0.5 0.5 moveto 0.5 kw1 add 0.5 lineto l5k neg l5k neg rlineto fill
        } if 25      l6k 0 gt
        {
        0.5 0.5 moveto 0.5 0.5 kw1 add lineto l6k  l6k neg rlineto fill
        } if 30      l7k 0 gt
        {
        0.5 0.5 moveto 0.5 kw1 sub 0.5 lineto l7k  l7k rlineto fill
        } if 35      l8k 0 gt
        {
        0.5 0.5 moveto 0.5 0.5 kw1 sub lineto l8k neg l8k rlineto fill
        } if
        %----------
        % curve for red
        % red is a vertical squiggle
        gsave
        0 setgray    % set red to gray
        % first check to see if there is any red to be drawn
        rwcorpat 0 gt
        {
        % here we draw the basic red pattern
50      % it is the two sides of the two arcs
```

```
newpath
0.5 1.1 moveto
0.644 rwcorpat sub 0.75 .288 110 240 arc
0.356 rwcorpat sub 0.25 .288 60 290 arcn
0.356 rwcorpat add 0.25 .288 290 60 arc
0.644 rwcorpat add 0.75 .288 240 110 arcn
fill % these next two fills give the connecting arcs for neighboring cells
% this is so we get a clean join were the patterns meet across the cell edge
1.5 1.1 moveto
1.644 rwcorpat sub 0.75 .288 110 240 arc
1.5 0.5 lineto
fill -0.5 0.5 moveto
-0.644 rwcorpat add 0.25 .288 290 60 arc
-0.5 0 lineto
fill } if %red growth
% these are the fills for the partial pattern
% there are 4 cases since each side of each arc can grow
% we first check to see if there is some growth necessary before drawing
% growth is done by extending the arc length for a thicker pattern
% we include the adjoining cell piece
l1r 0 gt {
  0.5 0.5 moveto
  0.644 rw1 sub 0.75 0.288 240 240 l1r sub arcn
  0.644 rwcorpat add 0.75 0.288 240 l1r sub 240 arc
  fill
} if l1r 0 gt {
  1.5 0.5 moveto
  1.644 rw1 sub 0.75 0.288 240 240 l1r sub arcn
  1.644 rwcorpat add 0.75 0.288 240 l1r sub 240 arc
  fill
} if l2r 0 gt {
  0.5 0.5 moveto
  0.356 rw1 sub 0.25 0.288 60 60 l2r sub arcn
  0.356 rwcorpat add 0.25 0.288 60 l2r sub 60 arc
  fill
} if
```

```
        l3r 0 gt {
        0.5 0.5 moveto
        0.644 rw1 sub 0.75 0.288 240 240 l3r sub arcn
        0.644 rw1 add 0.75 0.288 240 l3r sub 240 arc
 5      fill
        } if l4r 0 gt {
        0.5 0.5 moveto
10      0.356 rw1 sub 0.25 0.288 60 60 l4r sub arcn
        0.356 rw1 add 0.25 0.288 60 l4r sub 60 arc
        fill
        } if 15
        l4r 0 gt {
        -0.5 0.5 moveto
        -0.644 rw1 sub 0.25 0.288 60 60 l4r sub arcn
        -0.644 rw1 add 0.25 0.288 60 l4r sub 60 arc
20      fill
        } if grestore

25
        %----------------

% fills for blue
        % blue is two diagonal lines
        gsave
        0 setgray       % set blue to gray
        newpath
        % the lines are constructed as polygons
        % we only do it if there is some blue to draw
        bwcorpat 0 gt {
        % polygon vertices are extended outside the cell to be sure you can't see ends
        -0.25 bwcorpat sub 0.25 bwcorpat add moveto
40      -0.25 bwcorpat add 0.25 bwcorpat sub lineto
        0.75 bwcorpat add 1.25 bwcorpat sub lineto
        0.75 bwcorpat sub 1.25 bwcorpat add lineto
        fill 45      % this is the second line
        0.25 bwcorpat sub -0.25 bwcorpat add moveto
        0.25 bwcorpat add -0.25 bwcorpat sub lineto
        1.25 bwcorpat add 0.75 bwcorpat sub lineto
        1.25 bwcorpat sub 0.75 bwcorpat add lineto
50      fill
```

```
        } if

% blue growth
        % this draws the partial pattern where required
   5    % there are 4 possible fills for the two sides of the two lines
        % the extension grow in both directions from the line center
        l1b 0 gt {
            0.75 l1b sub bwcorpat add 0.25 l1b sub bwcorpat sub moveto
            0.75 l1b add bwcorpat add 0.25 l1b add bwcorpat sub lineto
  10        0.75 l1b add bw1 sub  0.25 l1b add bw1 add lineto
            0.75 l1b sub bw1 sub  0.25 l1b sub bw1 add lineto
            fill
        } if 15    l4b 0 gt {
            0.75 l4b sub bw1 sub 0.25 l4b sub bw1 add moveto
            0.75 l4b add bw1 sub 0.25 l4b add bw1 add lineto
            0.75 l4b add bw1 add  0.25 l4b add bw1  sub  lineto
            0.75 l4b sub bw1 add  0.25 l4b sub bw1  sub  lineto
  20        fill
        } if l2b 0 gt {
            0.25 l2b sub bwcorpat add 0.75 l2b sub bwcorpat sub moveto
  25        0.25 l2b add bwcorpat add 0.75 l2b add bwcorpat sub lineto
            0.25 l2b add bw1 sub  .75 l2b add bw1 add  lineto
            0.25 l2b sub bw1 sub  .75 l2b sub bw1 add  lineto
            fill
        } if
  30
        l3b 0 gt {
            0.25 l3b sub bw1 sub 0.75 l3b sub bw1 add moveto
            0.25 l3b add bw1 sub 0.75 l3b add bw1 add lineto
            0.25 l3b add bw1  add 0.75 l3b add bw1  sub lineto
  35        0.25 l3b sub bw1  add 0.75 l3b sub bw1 sub lineto
            fill
        } if 40    grestore % fills for green
        % The pattern for green is a cross
        gsave
        0 setgray     % set green to gray
        newpath % the lines are actually constructed as polygons
        % this is the horizontal line
```

```
    gwcorpat 0 gt {
        0 gwcorpat sub 0.5 gwcorpat add moveto
        1 gwcorpat add 0.5 gwcorpat add lineto
        1 gwcorpat add 0.5 gwcorpat sub lineto
5       0 gwcorpat sub 0.5 gwcorpat sub lineto
        fill
    } if % this is the vertical line
10  gwcorpat 0 gt {
        0.5 gwcorpat sub 0 gwcorpat sub moveto
        0.5 gwcorpat sub 1 gwcorpat add lineto
        0.5 gwcorpat add 1 gwcorpat add lineto
        0.5 gwcorpat add 0 gwcorpat sub lineto
15      fill
    } if 20  % now we do the partial pattern for green where necessary
    % the partial is a thicker line segment that grows out in both directions
    % from the center
    % this is one side of the horizontal
    l1g 0 gt {
25      0.5 l1g sub 0.5 gwcorpat sub moveto
        0.5 l1g add 0.5 gwcorpat sub lineto
        0.5 l1g add 0.5 gw1 add lineto
        0.5 l1g sub 0.5 gw1 add lineto
        fill
30  } if % one side of the vertical
    l2g 0 gt {
        0.5 gwcorpat sub 0.5 l2g sub moveto
35      0.5 gwcorpat sub 0.5 l2g add lineto
        0.5 gw1 add  0.5 l2g add lineto
        0.5 gw1 add  0.5 l2g sub lineto
        fill
    } if
40
    % second horizontal side
    l3g 0 gt {
        0.5 l3g sub 0.5 gw1 sub moveto
        0.5 l3g add 0.5 gw1 sub lineto
45      0.5 l3g add 0.5 gw1 add lineto
        0.5 l3g sub 0.5 gw1 add lineto
        fill
    } if 50  %second vertical side
```

```
        14g 0 gt {
            0.5 gw1 sub 0.5 14g sub moveto
            0.5 gw1 sub 0.5 14g add lineto
            0.5 gw1 add 0.5 14g add lineto
5           0.5 gw1 add 0.5 14g sub lineto
            fill
        } if grestore
10

%--------
        % fills for magenta
        % magenta is two diagonal lines
        gsave
        0 setgray    % set magenta to gray newpath
        % the lines are constructed as polygons
        % we only do it if there is some magenta to draw
        mwcorpat 0 gt {
            % polygon vertices are extended outside the cell to be sure you can't see ends
            0.75 mwcorpat sub -0.25 mwcorpat sub moveto
25          0.75 mwcorpat add -0.25 mwcorpat add lineto
            -0.25 mwcorpat add 0.75 mwcorpat add lineto
            -0.25 mwcorpat sub 0.75 mwcorpat sub lineto
            fill 30
            1.25 mwcorpat sub 0.25 mwcorpat sub moveto
            1.25 mwcorpat add 0.25 mwcorpat add lineto
            0.25 mwcorpat add 1.25 mwcorpat add lineto
            0.25 mwcorpat sub 1.25 mwcorpat sub lineto
35          fill
        } if % mag growth
        % this draws the partial pattern where required
40      % there are 4 possible fills for the two sides of the two lines
        % the extension grow in both directions from the line center
        l1m 0 gt{
            0.75 l1m sub mwcorpat add 0.75 l1m add mwcorpat add moveto
            0.75 l1m add mwcorpat add 0.75 l1m sub mwcorpat add lineto
45          0.75 l1m add mw1 sub  0.75 l1m sub mw1 sub lineto
            0.75 l1m sub mw1 sub  0.75 l1m add mw1 sub lineto
            fill
        } if 50      l4m 0 gt {
```

-59-

```
         0.75 l4m sub mw1 sub 0.75 l4m add mw1 sub moveto
         0.75 l4m add mw1 sub 0.75 l4m sub mw1 sub lineto
         0.75 l4m add mw1 add  0.75 l4m sub mw1  add  lineto
         0.75 l4m sub mw1 add  0.75 l4m add mw1  add  lineto
5        fill
         } if l2m 0 gt {
         0.25 l2m sub mwcorpat add 0.25 l2m add mwcorpat add moveto
10       0.25 l2m add mwcorpat add 0.25 l2m sub mwcorpat add lineto
         0.25 l2m add mw1 sub .25 l2m sub mw1 sub  lineto
         0.25 l2m sub mw1 sub .25 l2m add mw1 sub  lineto
         fill
         } if
15
         l3m 0 gt {
         0.25 l3m sub mw1 sub 0.25 l3m add mw1 sub moveto
         0.25 l3m add mw1 sub 0.25 l3m sub mw1 sub lineto
         0.25 l3m add mw1 add 0.25 l3m sub mw1 add lineto
20       0.25 l3m sub mw1 add 0.25 l3m add mw1 add lineto
         fill
         } if grestore
25

%--------
         % draw the yellow pattern
         % yellow is a circle
         gsave
         0 setgray    % set yellow to gray % check to see if there is yellow to draw
         ywcorpat 0 gt
         {
         ywcorpat setlinewidth    % yellow is drawn as a stroke
         0.5 0.5 .25 0 360 arc stroke
         } if
40
         % growth in yellow is done as a partial circle
         l1y 0 gt
         {
         yw1 setlinewidth          % use the thicker line width
45       0.5 0.5 0.25 0 l1y arc stroke   % and draw the arc
         } if grestore

50       %-------
```

```
        % curve for cyan
        % cyan is a horizontal squiggle
        gsave
        0 setgray    % set cyan to gray % first check to see if there is any cyan to be drawn
        cwcorpat 0 gt
        {
        newpath
        % here we draw the basic cyan pattern
        % it is the two sides of the two arcs
        1.1 0.5 moveto
15
        0.75 0.644 cwcorpat sub .288 330 210 arcn
        0.25 0.356 cwcorpat sub .288 30 150 arc
        0.25 0.356 cwcorpat add .288 150 30 arcn
        0.75 0.644 cwcorpat add .288 210 330 arc  fill
20
        % these next two fills give the connecting arcs for neighboring cells
        % this is so we get a clean join were the patterns meet across the cell edge
        .75 1.5 moveto
        0.75 1.644 cwcorpat sub .288 330 200 arcn
25      0.5 1.5 lineto
        fill 0.5 -0.5 moveto
        0.25 -0.644 cwcorpat add .288 20 150 arc
30      -0.5 0 lineto
        fill } if 35      %cyan growth
        % these are the fills for the partial pattern
        % there are 4 cases since each side of each arc can grow
        % we first check to see if there is some growth necessary before drawing
        % growth is done by extending the arc length for a thicker pattern
        % we include the adjoining cell piece
        llc 0 gt {
          0.5 0.5 moveto
          0.75 0.644 cw1 sub 0.288 210 210 llc add arc
          0.75 0.644 cwcorpat add 0.288 210 llc add 210 arcn
          fill
        } if llc 0 gt {
          0.5 1.5 moveto
          0.75 1.644 cw1 sub 0.288 210 210 llc add arc
```

```
          0.75 1.644 cwcorpat add 0.288 210 11c add 210 arcn
          fill
          } if 5        12c 0 gt {
          0.5 0.5 moveto
          0.25 0.356 cw1 sub 0.288 30 30 12c add arc
          0.25 0.356 cwcorpat add 0.288 30 12c add 30 arcn
          fill
10        } if 13c 0 gt {
          0.5 0.5 moveto
          0.75 0.644 cw1 sub 0.288 210 210 13c add arc
15        0.75 0.644 cw1 add 0.288 210 13c add 210 arcn
          fill
          } if 14c 0 gt {
20        0.5 0.5 moveto
          0.25 0.356 cw1 sub 0.288 30 30 14c add arc
          0.25 0.356 cw1 add 0.288 30 14c add 30 arcn
          fill
          } if
25
          14c 0 gt {
          0.5 -0.5 moveto
          0.25 -0.644 cw1 sub 0.288 30 30 14c add arc
          0.25 -0.644 cw1 add 0.288 30 14c add 30 arcn
30        fill
          } if grestore 35        %--------------------------------
          % As the colors become more saturated, the patterns grow to they fill the cell
          % It this happens we no longer have a distinguishable pattern
          % To prevent this and to give a clean pattern shape we overlay a white curve
          % along the boundary where the pattern components meet
          % This is done for r, g, b, c, m % if there is red we draw a white vertical squiggle along the cell boundary
          rwcorpat thickenough gt
          { 1 setgray
            0.05 setlinewidth
            newpath 1.144 0.75 .288 110 250 arc stroke
            -0.144 0.25 .288 290 70 arc stroke
          } if
```

```
% if there is enough blue we place a diagonal white line down the cell center
bwcorpat thickenough gt
{ gsave
  1 setgray
  newpath
  0.1 setlinewidth
  0 0 moveto bw1 4 mul dup lineto stroke
  grestore
} if % for green we draw a white cross along the cell boundary
gwcorpat thickenough gt
{ gsave
  1 setgray
  newpath
  0.05 setlinewidth
  0 0 moveto 1.0 0 lineto 1.0 0.05 lineto 0.0 0.05 lineto fill
  0 0 moveto 0 1 lineto  0.05 1 lineto 0.05 0 lineto fill
  grestore
} if % if there is enough magenta we place a diagonal white line down the cell center
mwcorpat thickenough gt
{
  1 setgray
  newpath 0.75 mw1 0.035 add dup 0.25 gt { pop 0.25 } if add
  -0.25 mw1 0.035 add dup 0.25 gt { pop 0.25 } if add moveto
  0.75 mw1 dup 0.215 gt { pop 0.215 } if add
  -0.25 mw1 dup 0.215 gt { pop 0.215 } if add lineto
  -0.25 mw1 dup 0.215 gt { pop 0.215 } if add
  0.75 mw1 dup 0.215 gt { pop 0.215 } if add lineto
  -0.25 mw1 0.035 add dup 0.25 gt { pop 0.25 } if add
  0.75 mw1 0.035 add dup 0.25 gt { pop 0.25 } if add lineto
  fill } if % draw horizontal white squiggle along cell boundary for near solid cyan
cwcorpat thickenough gt
{ 1 setgray
  0.05 setlinewidth
  newpath 0.75 1.144 .288 330 200 arcn stroke
```

```
            0.25 -0.144 .288 20 160 arc stroke
          } if

% We handle yellow somewhat differently,
          % We dont use a white line because yellow will probably print as light gray or white
          % and it wouldn't be seen.
          % We use black dashes so yellow will be visible.
          % In order to distinguish strong yellow from weak we change the dash length
       %ywcorpat 0.05 gt    % if there is some yellow (so we don't hide it)
          %{
          %0 setgray    % set red to gray
          % [0.2 ycorpat mul dup 0.8 exch sub] 0.4 setdash   % dash length by yellow strength
          % newpath
          %0.5 0.5 .25 0 360 arc stroke       % draw a dashed circle %} if grestore
          end
          } bind def 25     /setnewpattern
          % This operator constructs and installs a pattern for a color
          % It expects the RGB color coordinates on the stack
          {
          gsave    % save the current transformation
   30     matrix defaultmatrix setmatrix    % install the default transformation
                                            % so we will know the pattern size
          patterncellsize patterncellsize scale   % scale to the desired size % A PostScript pattern is actually defined by a dictionary
   35     % that includes among other things the procedure for drawing the pattern shape
          % Here is our pattern dictionary
          <<
          4 1 roll      % we roll the color coordinates into the dictionary
          /patr 4 1 roll   % and assign them to variables
   40     /patg 3 1 roll
          /patb exch
          /PaintType 1     % It is a colored pattern
          /PatternType 1 /TilingType 1     % It uses constant spacing
          /BBox [0 0 1 1]                  % Its a unit cell in the pattern coordiates
   45     /XStep 1 /YStep 1
          /PaintProc {     % and to draw the pattern we call buildpattern with r, g, b
          begin
          patr patg patb buildpattern
          end
   50     }
```

```
        >>
        matrix      % Identity matrix, no further transformation
        makepattern     % Here we construct the pattern
        grestore
5       setpattern  % Now we install the pattern as the current color
        } bind def %----------------------------------
10
        /rectfill
        % redefinition of the operator to fill with a pattern
        {
        % save current color information
15      /colorsaver [ currentcolor currentcolorspace ] def
        currentrgbdecodecolor setnewpattern      % set the color to a pattern
        rectfill                                  % do the fill
        colorsaver aload pop  setcolorspace setcolor   % restore the color
        } bind def
20

/fill
        % redefinition of the operator to fill with a pattern
        {
25      % save current color information
        /colorsaver [ currentcolor currentcolorspace ] def
        currentrgbdecodecolor setnewpattern      % set the color to a pattern
        fill                                      % do the fill
        colorsaver aload pop  setcolorspace setcolor   % restore the color
30      } bind def /eofill
        % redefinition of the operator to fill with a pattern
35      {
        % save current color information
        /colorsaver [ currentcolor currentcolorspace ] def
        currentrgbdecodecolor setnewpattern      % set the color to a pattern
        eofill                                    % do the fill
40      colorsaver aload pop  setcolorspace setcolor   % restore the color
        } bind def /ufill
45      % redefinition of the operator to fill with a pattern
        {
        % save current color information
        /colorsaver [ currentcolor currentcolorspace ] def
        currentrgbdecodecolor setnewpattern      % set the color to a pattern
50      ufill                                     % do the fill
```

```
       colorsaver aload pop setcolorspace setcolor   % restore the color
       } bind def 5     /ueofill
       % redefinition of the operator to fill with a pattern
       {
       % save current color information
       /colorsaver [ currentcolor currentcolorspace ] def
10     currentrgbdecodecolor setnewpattern          % set the color to a pattern
       ueofill                                      % do the fill
       colorsaver aload pop setcolorspace setcolor  % restore the color
       } bind def

```

We claim:

1. A document reproduction system, for reproducing a color document in a format enabling improved black and white copying retaining color intent of the color document, including:
   a document input, receiving electronic documents having image areas therein designated to be printed in a plurality of colors;
   an image processing unit, processing said documents for printing and converting each color into a set of repeated patterns, each set of repeated patterns unique to a single color and corresponding to a basis color set, said patterns varying with the a density of color in a corresponding area in the document;
   a printer, reproducing said image areas with, whereby patterns for each color are added together to form a final image, which when copied, retains color intent in terms of differentiation of areas of color;
   where said printer is a color printer, printing each color with a single colorant in a limited set of thereof.

2. A method for reproducing a color document in a format enabling improved black and white copying retaining color intent of the color document including:
   receiving electronic documents having image areas therein designated to be printed in a plurality of colors;
   defining for a preselected color, a pattern block unique to said preselected color;
   forming a representation of said image areas in terms of repetitions of said pattern blocks defined for each color, each repetition of a pattern block varying with any density change within the image areas;
   printing said electronic document with each of said representations in superposed relationship.

3. The method as described in claim 2, including
   upon receiving said electronic document, converting the document to a description thereof in terms of densities of colors selected from a set of preselected colors.

4. The method as defined in claim 3, and including, prior to printing:
   converting said representation from pattern blocks associated with the preselected colors to said a representation in terms of pattern blocks associated with printer colorants.

5. A method for reproducing a color document in a format enabling improved black and white copying retaining color intent of the color document including:
   receiving electronic documents having image areas therein designated to be printed in a plurality of colors;
   defining for said preselected colors, a pattern block unique to said preselected color;
   performing a full undercolor removal operation on said images areas, whereby any pixels in the image area are defined by two of said preselected colors and black;
   forming a representation of each color corresponding to the remaining preselected colors and black in terms of repetitions of said pattern blocks defined for each color, each repetition of a pattern block varying with any density changed within the image areas;
   printing said electronic document with each of said color representations in superposed relationship.

6. The method described in claim 5, wherein the received electronic document is defined by separations.

7. The method described in claim 6, including:
   upon receiving said electronic document, converting the document to a description thereof in terms of densities of colors selected from a set of preselected colors.

8. The method as defined in claim 6, and including, prior to printing:
   converting said representation from pattern blocks associated with the preselected colors to said a representation in terms of pattern blocks associated with printer colorants.

9. The method described in claim 6, wherein the preselected colors include cyan, yellow and magenta.

10. The method as described in claim 9, and, after said full undercolor removal operation including:
    finding the minimum density from among the two remaining preselected colors;
    using said minimum density to convert the preselected color from cyan, magenta, and yellow descriptions to red, green, blue, cyan, magenta, and yellow descriptions.

11. The method as defined in claim 5, and including:
    determining any areas in said image areas where the document will be printed with black over any of said preselected color;
    removing from said areas one of either of said black and said preselected colors.

12. A method for reproducing a color document in a format enabling improved black and white copying retaining color intent of the color document including:
    a document input, receiving electronic documents having continuous tone image areas therein designated to be printed with a plurality of colors;
    defining for a preselected color, a screen pattern unique to said preselected color;
    screening each color, using said unique screen patterns therefor to quantize said pixels, forming a representation of each color terms of repetitions of said pattern blocks defined for each color, each repetition of a pattern block varying with any density changes within the image areas;
    printing said electronic document with each of said color representations in superposed relationship.

13. A method for reproducing a color document on a black and white printer in a format enabling improved black and white copying, while retaining color intent of the color document including:
    a document input, receiving electronic documents having image areas therein designated to be printed in a plurality of colors;
    defining for a preselected color in a set of basis colors, a pattern block unique to said preselected color;
    forming a representation of each of said plurality of colors in terms of repetitions of said pattern blocks defined for each preselected color, each repetition of a pattern block varying with any density change within the image areas;
    combining said representations into a single representation suitable for printing on a black and white printer, and printing said representation.

14. The method as defined in claim 13, including the step of
    printing said electronic document with each of said color representations in superposed relationship.

* * * * *